United States Patent
Desai et al.

(10) Patent No.: US 8,382,174 B2
(45) Date of Patent: Feb. 26, 2013

(54) SYSTEM, METHOD, AND APPARATUS FOR SUCTION GRIPPING

(75) Inventors: Jaydev P. Desai, Bethesda, MD (US); Chad Kessens, Rosedale, MD (US)

(73) Assignees: University of Maryland, College Park, MD (US); Motile Robotics, Inc., Joppa, MD (US)

( * ) Notice: Subject to any disclaimer, the term of this patent is extended or adjusted under 35 U.S.C. 154(b) by 0 days.

(21) Appl. No.: 12/901,241

(22) Filed: Oct. 8, 2010

(65) Prior Publication Data
US 2011/0115243 A1    May 19, 2011

Related U.S. Application Data

(60) Provisional application No. 61/249,728, filed on Oct. 8, 2009.

(51) Int. Cl.
*B66C 1/02* (2006.01)
(52) U.S. Cl. .......................... 294/65; 294/186; 294/188
(58) Field of Classification Search .............. 294/65, 294/186, 188; 901/40; 269/21
See application file for complete search history.

(56) References Cited

U.S. PATENT DOCUMENTS

| | | | | |
|---|---|---|---|---|
| 3,704,038 | A  * | 11/1972 | Glanemann | 294/65 |
| 4,708,381 | A  * | 11/1987 | Lundback | 294/186 |
| 7,000,964 | B1 * | 2/2006 | Porras et al. | 294/186 |
| 7,017,961 | B1 * | 3/2006 | Parnell et al. | 294/2 |
| 7,029,046 | B2 * | 4/2006 | Lim | 294/65 |
| 2009/0066098 | A1* | 3/2009 | Subotincic | 294/65 |

OTHER PUBLICATIONS

Autumn, K., Dittmore, A., Santos, D., Spenko, M., and Cutkosky, M., 2006. "Frictional adhesion: A new angle on gecko attachment". Journal of Experimental Biology, 209, August, pp. 3569-3579.
Beer, R. D., Quinn, R. D., Chiel, H. J., and Ritzmann, R. E., 1997. "Biologically inspired approaches to robotics. what can we learn from insects?". Communications of the ACM, 40(3), March, pp. 31-38.
Hirose, S., 1993. Biologically Inspired Robots—Snakelike Locomotors and Manipulators. Oxford University Press, Oxford, UK.
Walker, I. D., Dawson, D. M., Flash, T., Grasso, F. W., Hanlon, R. T., Hochner, B., Kier,W. M., Pagano, C. C., Rahn, C. D., and Zhang, Q. M., 2005. "Continuum robot arms inspired by cephalopods". In 2005 SPIE Conference on Unmanned Ground Vehicle Technology IV.
Bandyopadhyay, P. R., Hrubes, J. D., and Leinhos, H. A., 2008. "Biorobotic adhesion in water using suction cups". Bioinspiration and Biomimetics, March.
Murphy, M. P., Tso, W., Tanzini, M., and Sitti, M., 2006. "Waalbot: An agile small-scale wall climbing robot utilizing pressure sensitive adhesives". In Proceedings of the 2006 IEEE/RSJ International Conference on Intelligent Robots and Systems, pp. 3411-3416.

(Continued)

*Primary Examiner* — Saul Rodriguez
*Assistant Examiner* — Gabriela Puig
(74) *Attorney, Agent, or Firm* — Carter, DeLuca, Farrell & Schmidt, LLP

(57) ABSTRACT

A suction gripper includes a cup member, a suction port, and a valve. The cup member has inner and outer surfaces defining an opening such that the inner surface defines an inner cavity. The suction port provides suction. The valve in is fluid communication with the suction port and the inner cavity of the cup member to modify the suction therebetween. The valve is operatively coupled to the cup member and is adapted to passively actuate in response to an applied force to the cup member.

31 Claims, 20 Drawing Sheets

OTHER PUBLICATIONS

Wile, G., and Aslam, D. M., 2007. "Design, fabrication, and testing of a miniature wall climbing robot using smart robotic feet". In Proceedings of the 2007 International Conference on Cybernetics and Information Technologies, Systems and Applications, vol. 3, pp. 87-92.

Qian, Z. Y., Zhao, Y. Z., Fu, Z., and Cao, Q. X., 2006. "Design and realization of a non-actuated glasscurtain wall-cleaning robot prototype with dual suction cups". International Journal of Advanced Manufacturing Technology, 30, April, pp. 147-155.

Backes, P. G., Bar-Cohen, Y., and Joffe, B., 1997. "The multifunction automated crawling system (macs)". In IEEE International Conference on Robotics and Automation, vol. 1, pp. 335-340.

Cepolina, F., Michelini, R. C., Molfino, R. M., and Razzoli, R. P., 2000. "Gecko-collie: Homecleaning automation of floors, walls, and cupboards". In Third International Conference on Climbing and Walking Robots.

Miyake, T., Ishihara, H., Shoji, R., and Yoshida, S., 2006. "Development of small-size window cleaning robot by wall climbing mechanism". In Proceedings of the 23rd International Symposium on Automation and Robotics in Construction, pp. 215-220.

Siegel, M. W., Kaufman, W. M., and Alberts, C. J., 1993. "Mobile robots for difficult measurements in difficult environments: Application to aging aircraft inspection". Robotics and Autonomous Systems, 11, pp. 187-194.

Monkman, G. J., Hesse, S., Steinmann, R., and Schunk, H., 2007. Robot Grippers. Wiley-VCH, February.

Kolluru, R., Valavanis, K. P., Smith, S. A., and Tsourveloudis, N., 2000. "Design fundamentals of a reconfigurable robotic gripper system". IEEE Transactions on Systems, Man, and Cybernetics, 30(2), March, pp. 181-187.

Tsourveloudis, N., Kolluru, R., Valavanis, K., and Gracanin, D., 1999. "Position and suction control of a reconfigurable robotic gripper". Machine Intelligence and Robotic Control, 1(2), pp. 53-62.

Bouchard, A. T., 2006. "Design and control of a manipulator for autonomous joining of featureless panels". Master's thesis, Vanderbilt University, May.

Costo, S., Altamura, G., Bruzzone, L. E., Molfino, R. M., and Zoppi, M., 2002. "Design of a reconfigurable gripper for the fast robotic picking and handling of limp sheets". In Proceedings of the 33rd International Symposium on Robotics.

Hannan, M. W., and Burks, T. F., 2004. "Current developments in automated citrus harvesting". In 2004 ASAE/CSAE Annual International Meeting.

Monta, M., Kondo, N., and Ting, K. C., 1998. "Endeffectors for tomato harvesting robot". Artificial Intelligence Review, 12, pp. 11-25.

Neveryd, H., Eftring, H., and Bolmsjo, G., 1999. "The swedish experience of rehabilitation robotics". In Proceedings of Rehabilitation Robotics Workshop.

Xiong, C. H., Wang, M. Y., Tang, Y., and Xiong, Y. L., 2005. "Compliant grasping with passive forces". Journal of Robotic Systems, 22(5), May, pp. 271-285.

Wang, M. Y., 2002. "Passive forces in fixturing and grasping". In Proceedings of the 9th IEEE Conference on Mechatronics and Machine Vision in Practice.

ANVER-Made Generic Replacements of P-Style Vacuum Cups and Suction Cups. Commercially available suction cup, pfl 16-si/c-f 15-sit.

Polyjet rapid prototyping materials, fullcure°R 830 verowhite and fullcure°R 930 tangoplus. Found at: http://objet.com/Misc/_Pages/FullCure_Materials_Data_Sheets/Vero_Family/FullCure830 http://objet.com/Misc/_Pages/FullCure_Materials_Data_Sheets/Tango_Family_/FullCure930.

Choi, Y. S., Deyle, T., Chen, T., Glass, J. D., and Kemp, C. C., 2009. "Benchmarking assistive mobile manipulation: A list of household objects for robotic retrieval prioritized by people with als". In Proceedings of the 2009 IEEE International Conference of Rehabilitation Robotics (ICORR).

Dollar, A. M., and Howe, R. D., 2007. "The sdm hand as a prosthetic terminal device: A feasibility study". In Proceedings of the 2007 IEEE International Conference on Rehabilitation Robotics (ICORR).

FullCure Materials brochure. Found at: http://objet.com/Misc/_Pages/FullCure_Materials_Data_Sheets/Vero_Family/FullCure830/.

* cited by examiner

| Single Plug Experiment | Self-Sealing Cup | | | | | |
|---|---|---|---|---|---|---|
| | A | B | C | D | E | F |
| Nominal Pressure | 16 | 26 | 26 | 16 | 21 | 31 |
| Contact Pressure | 19 | 23 | 109 | 18 | 52 | 155 |
| Reseal Pressure 1 | 52 | 176 | 31 | 47 | 26 | 31 |
| Reseal Pressure 2 | 41 | 145 | N/A | 26 | N/A | N/A |

SYSTEM, METHOD, AND APPARATUS FOR SUCTION GRIPPING

PRIORITY CLAIM

The present application claims priority to and the benefit of the previously filed provisional application to Jaydev P. Desai of Bethesda, Md. and Chad C. Kessens of Rosedale, Md., having U.S. Appln. Ser. No. 60/249,728, entitled "Compliant Passive Grasping Technology for Arbitrary Shaped and Sized Objects," filed on Oct. 8, 2009, the entire contents thereof are incorporated herein by reference.

GOVERNMENT RIGHTS

This invention described herein was made with Government support under Grant: DAAB07-03-D-B010 awarded by The U.S. Army Research Laboratory. The government has certain rights in the invention described herein.

BACKGROUND

1. Technical Field

The present disclosure relates to suction grippers. More particularly, the present disclosure relates to a system, method, and apparatus for suction gripping using a passively actuated valve to control the suction.

2. Description of Related Art

Suction grippers (also referred to as "vacuum grippers") can be secured to workpieces for handling. Manipulators attached to the suction gripper, such as robot arms or industrial machine manipulators, can then transport the workpiece. Different workpieces (also referred to as "objects") require different corresponding suction grippers. The suction grippers are usually adapted to the size and weight of the workpiece to be manipulated. Suction grippers may include a continuous sealing lip to close a vacuum chamber (i.e., inner cavity) by fluidly sealing it with respect to the surroundings air/or or surrounding fluid. This enables relatively simple gripping and transport of various workpieces, such as metal sheets or glass plates.

Nature used suction technology for grasping and manipulating workpieces long before humans realized its technological potential. Octopuses, squid, and other cephalopods use tentacles with suction cups to grasp and manipulate food into their mouths. Biological examples of functionality such as these and others have provided the inspiration for numerous robotic techniques, including tentacle arms and suction cups, and may continue to do so in the foreseeable future.

A wide variety of robotic and automated tasks uses suction technology. For example, an application of suction technology has been robotic locomotion. Numerous wall-climbing robots use suction to grasp walls. Applications for wall climbing include surveillance, cleaning, and inspection of confined spaces such as those of an aircraft. Suction grippers have also been used for grasping and manipulation of workpieces in industrial settings. However, some prior art suction grippers are specific to particular types of workpiece, and have workpiece size and geometry constraints. For example, some prior art suction grippers for workpiece manipulation are designed to grasp flat, featureless panels, while other prior art grippers are designed for moving limp sheets, harvesting fruit, and/or holding documents. Although suction grippers are useful in a wide range of applications, some prior art suction grippers are designed for one specific workpiece size and geometry. The ability to utilize suction grippers on a single grasper for manipulating workpieces with widely varying shapes and sizes expands a robot's workpiece manipulation capability.

SUMMARY

In an embodiment of the present disclosure, a suction gripper includes a cup member, a suction port, and a valve. The cup member has inner and outer surfaces defining an opening such that the inner surface defines an inner cavity. The suction port provides a suction force. The valve is in fluid communication with the suction port and the inner cavity of the cup member to modify the suction therebetween. The valve is operatively coupled to the cup member and is adapted to passively actuate in response to an applied force to the cup member.

In another embodiment of the present disclosure, a suction system includes a sheet, and a plurality of suction grippers. The sheet includes a suction tube along a length thereof. Each of the plurality of suction grippers is disposed along the length of the rubber sheet. Each of the suction grippers includes a cup, a suction port and a valve. The cup member has inner and outer surfaces defining an opening. The inner surface defines an inner cavity. The suction port is operatively coupled to the rubber suction tube and is configured to provide suction. The valve is in fluid communication with the suction port and the inner cavity of the cup member to modify the suction therebetween. The valve is operatively coupled to the cup member and is adapted to passively actuate in response to an applied force to the cup member.

In yet another embodiment of the present disclosure, a suction gripper includes a suction means, a sealing means, and a valve means. The suction means provides a suction force. The sealing means seals against a workpiece. The valve means regulates the suction from the suction means to the sealing means.

In another embodiment of the present disclosure, a method of suction gripping includes a positioning act, an activating act, and a regulating act. The positioning act positions a cup member against a workpiece. The cup member has inner and outer surfaces defining an opening. The inner surface defines an inner cavity. The activating act activates a suction port that is configured to provide a suction force. The regulating act passively regulates a fluid communication between the suction port and the inner cavity of the cup member to modify the suction therebetween in response to an applied force to the cup member.

In yet another embodiment of the present disclosure, a suction gripper includes a substrate, a cup member, a suction port, a valve, and a mechanical linkage assembly. The cup has inner and outer surfaces that define an opening. The inner surface defines an inner cavity. The cup member is mechanically coupled to the substrate and is moveable from a first position to a second position relative to the substrate. The suction port provides suction. The valve is in fluid communication with the suction port and the inner cavity of the cup member to modify the suction therebetween. The valve is configured to open and close. The mechanical linkage assembly is adapted to open the valve when the cup member is in the first position and close the valve when the cup member is in the second position.

BRIEF DESCRIPTION OF THE DRAWINGS

These and other advantages will become more apparent from the following detailed description of the various embodiments of the present disclosure with reference to the drawings wherein.

DETAILED DESCRIPTION

In the Summary section above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "at least" followed by a number is used herein to denote the start of a range beginning with that number (which may be a range having an upper limit or no upper limit, depending on the variable being defined). For example, "at least one" means one or more than one. The term "at most" followed by a number is used herein to denote the end of a range ending with that number (which may be a range having 1 or 0 as its lower limit, or a range having no lower limit, depending upon the variable being defined). For example "at most 40%" means 40% or less than 40%. When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

Figure 1A:
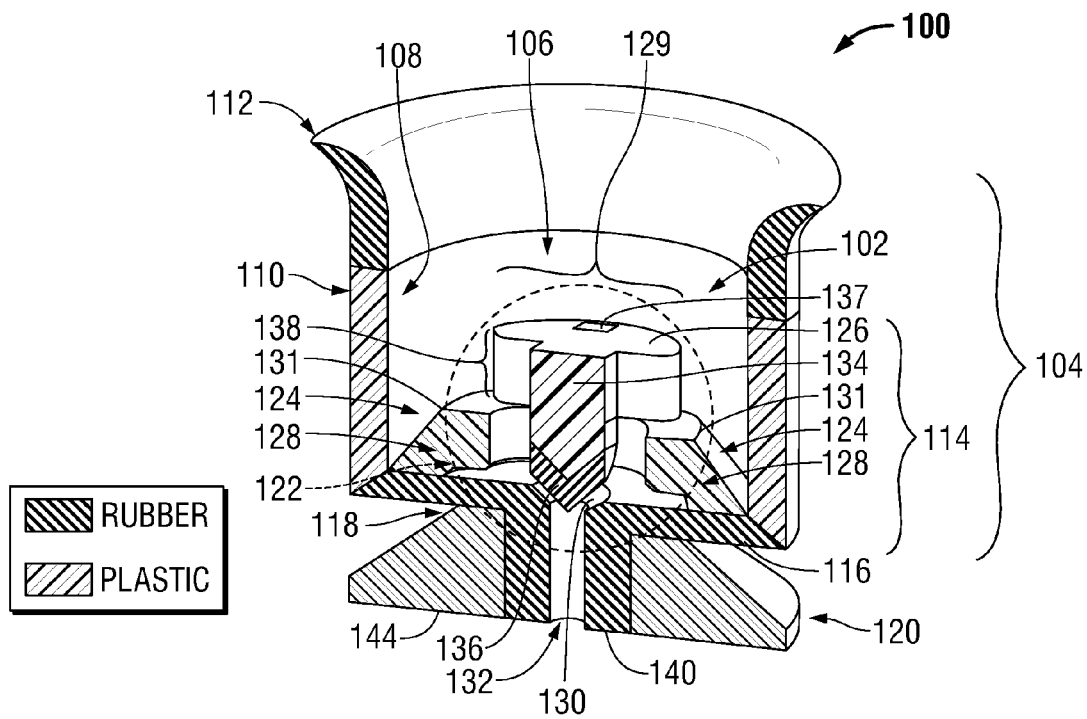
FIG. 1A is a perspective, cross-sectional side view of a suction gripper in accordance with an embodiment of the present disclosure.
Figure 1B:
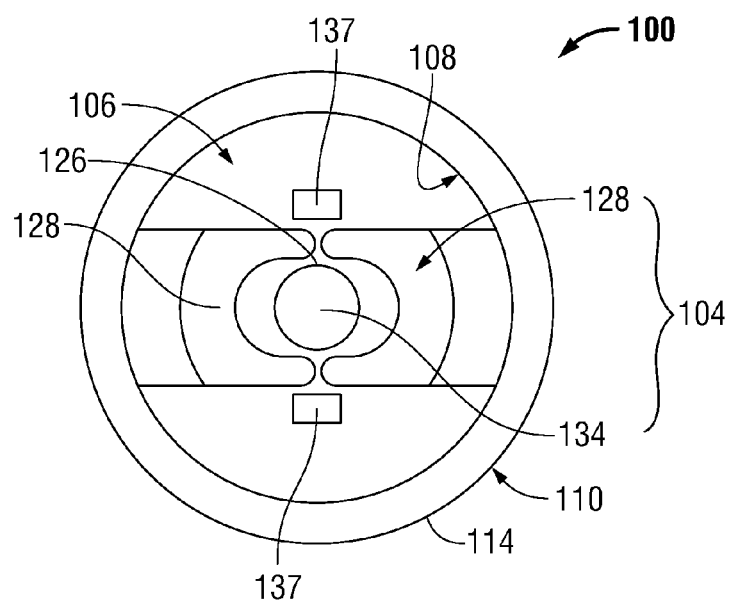
FIG. 1B is a cross-sectional top view of the suction gripper of FIG. 1A in accordance with an embodiment of the present disclosure.

Referring to FIGS. 1A and 1B, FIG. 1A is a perspective, cross-sectional side view of a suction gripper 100 in accordance with an embodiment of the present disclosure; and, FIG. 1B is a cross-sectional top view of the suction gripper 100 of FIG. 1A in accordance with an embodiment of the present disclosure. The suction gripper 100 may be used in any suitable fluid, for example: air, water, oil, gases, liquids, viscoelastic fluid and the like. Additionally or alternatively, the suction gripper 100 may be implemented using any type of fluid, for example: air, water, oil, gases, liquids, viscoelastic fluid and the like.

Suction gripper 100 includes a valve 102 and a cup member 104. The cup member 104 includes an inner surface 108 and an outer surface 110. As pressure is applied to the cup member 104, the valve 102 opens allowing a suction force to be created within an internal cavity 106 formed by an inner surface 108 of the cup member 104.

The cup member 104 includes a rubber lip 112 attached to a rigid cylinder 114 and a rubber base 116. The rubber base 116 may be stretched over the proximal side 118 of the collar 120. The stretching of the rubber base 116 over the proximal side 118 of the collar 120 actuates the valve 102 open. The valve 102 includes a mechanical linkage assembly 122 having a lifting member 124, and a plug 126. The mechanical linkage assembly 122 causes the lifting member 124 to lift the plug 126. The mechanical linkage assembly 122 includes hinges 128 having bends 131 to provide leverage to pull out the plug 126. The hinges 128 are a type of lifting member 124. The plug 126 may be any type of sealing member 129. For example, the sealing member 129 may be a device that seals an orifice 130 of the suction port 132. Alternative sealing members 128 may be a cork seal, any rubber seal, a polymer sealing member and/or the like.

The plug 126 includes an elongated shaft 134 coupled to a rubber tip 136 to plug the orifice 130. The plug 126 also includes a flange 138 at the other end of the elongated shaft 134. The elongated shaft 134 defines an axis. Springs 137 position the plug 126 so that the rubber tip 136 plugs the orifice 130 if no or minimal force is applied to the cup member 104. A suction port 132 includes a tube 140. The opening of the tube 140 forms the orifice 130. The tube 140 may be rubber, a plastic, pliable, rigid, or semi-rigid to prevent it from being crushed.

When a sufficient force is applied to the cup member 104, the rubber base 116 stretches over the proximal side 118 of the collar 120. The collar 120 includes a proximal side 118 and a distal side 144. The stretching of the rubber base 116 over the collar 120 provides leverage for hinges 128. The proximal side 118 of the collar 120 provides a fulcrum for hinges 128. As hinges 128 hinge outward, the edge of the hinges mechanically cooperate with the flange 138 of the plug 126 to pull the plug 126 away from the suction port 132. As the plug 126 is pulled away from the suction port 132, the rubber tip 136 of the plug 126 unplugs (or unseals) the orifice 130 of the suction port 132 thereby lowering the pressure within the internal cavity 106 of the cup member 104 when the lips 112 are sufficiently sealed against a workpiece (not shown in FIGS. 1A-1B).

When a sufficient force is applied to the cup member 104 via interaction with a workpiece, the valve 102 opens to allow suction on that workpiece (not shown in FIGS. 1A-1B). However, if the cup member 104 is not in contact with a workpiece, the valve 102 remains sealed, minimizing leakage through the unengaged cup member 104 thereby maximizing the suction force other suction grippers' connection to the same suction supply (see FIG. 9). Thus, a large number of suction grippers 100 could be placed on a robotic manipulator (not shown), and still maintain sufficient suction per suction gripper to pick up small workpieces.

Figure 9:
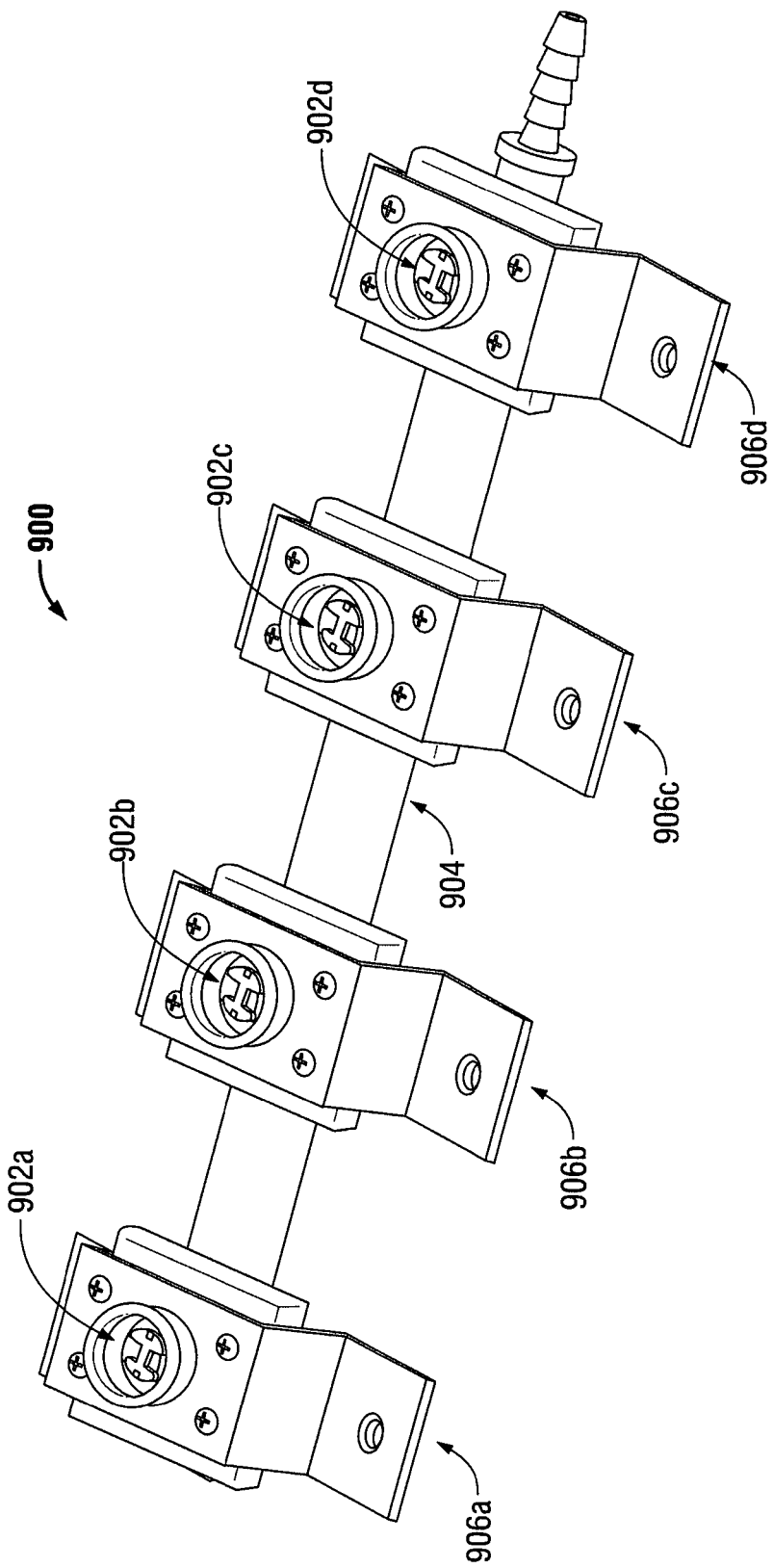
FIG. 9 shows multiple suction grippers disposed on a substrate in accordance with an embodiment of the present disclosure.

The size of the cup member 104 may be designed based upon the application because the smaller the cup member 104, the smaller the item that it can sufficiently pick up. In addition, smaller cup members 104 can better accommodate the surface irregularities of the workpiece being grasped if a plurality of cup members 104 are distributed on a flexible substrate 904 as shown in FIG. 9 allowing the suction gripper 100 to adapt to the shape of the workpiece to engage it. At the same time, manipulating large workpieces would typically demand a large number of suction grippers 100. Preferably, in some embodiments, the design of the suction gripper 100 may be small and simple for easy replication.

In some embodiments, weight of the suction gripper 100 may be a consideration. Typically, in certain applications, a robotic manipulator's (not shown) payload capacity diminishes with the weight of each new component on the manipulator. Components near the end of the manipulator are particularly important because they impose the greatest moment on the manipulator while being in the most useful location for manipulation. Therefore, in a preferred embodiment, suction gripper 100 is made of a light material to minimize weight. The suction gripper 100 uses a passively actuated valve 102 (e.g., a force on the cup member 104 opens the valve 102). This is achieved by using two materials with differing elastic moduli, i.e. making some parts from soft rubber and others from a harder plastic.

FIG. 1A shows a vertical cross-section of the design concept as modeled in SolidWorks™. The plug 126 is located inside the cup member 104 and is positioned very close to the suction tube 140, e.g., the rubber tip 136 of the plug 126 is positioned over the orifice 130. Due to the plug's 126 proximity to the orifice 130, the plug 126 gets sucked into the orifice 130 of the tube 140 when the central suction line is powered, sealing the orifice 130 due to the suction force. The plug's 126 position is maintained through its attachment to a pair of springs 137 connected to the rubber base 116 also shown in FIG. 1B. The springs 137 are attached at one end to the flange 138 of the plug 126 and at the other end to the rubber base 116. Additionally or alternatively, in some embodiments, springs 137 may be made of rubbers, polymers, plastics, may be coil springs, metallic springs, or any other sufficient material or structure providing sufficient elasticity.

Figure 2A:
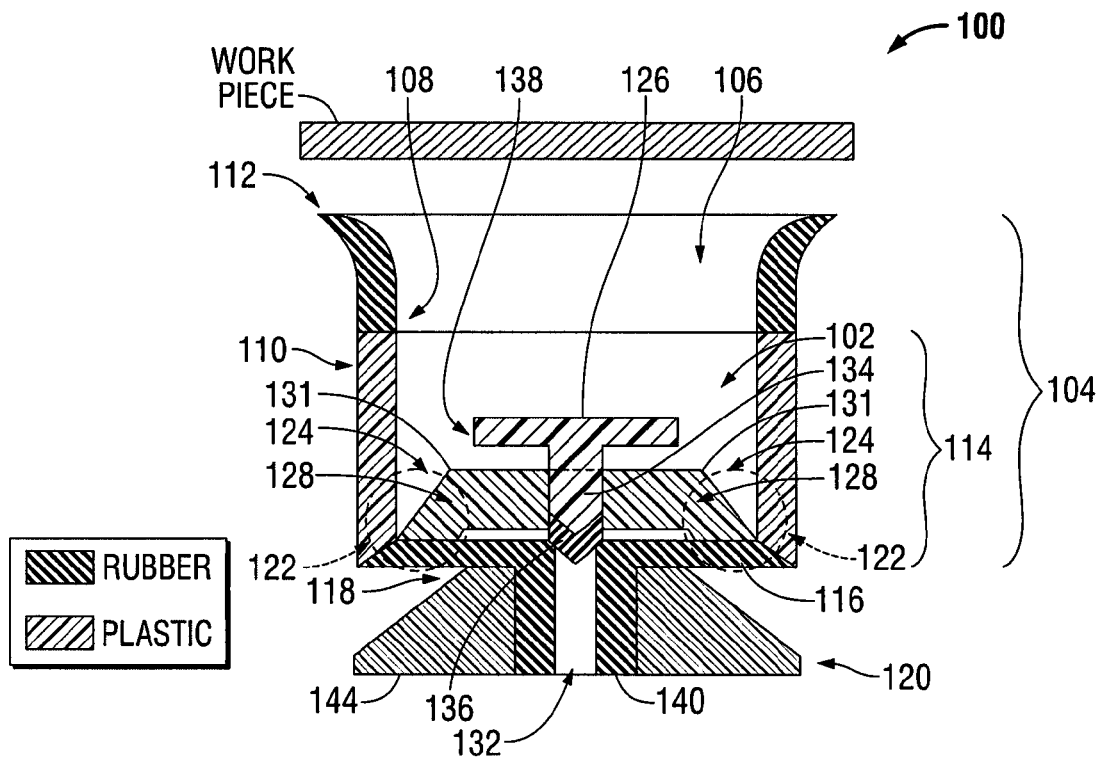
FIGS. 2A-2B are cross-sectional schematic views of the suction gripper of FIGS. 1A-1B showing the valve in closed and opened positions, respectively, in accordance with an embodiment of the present disclosure.
Figure 2B:
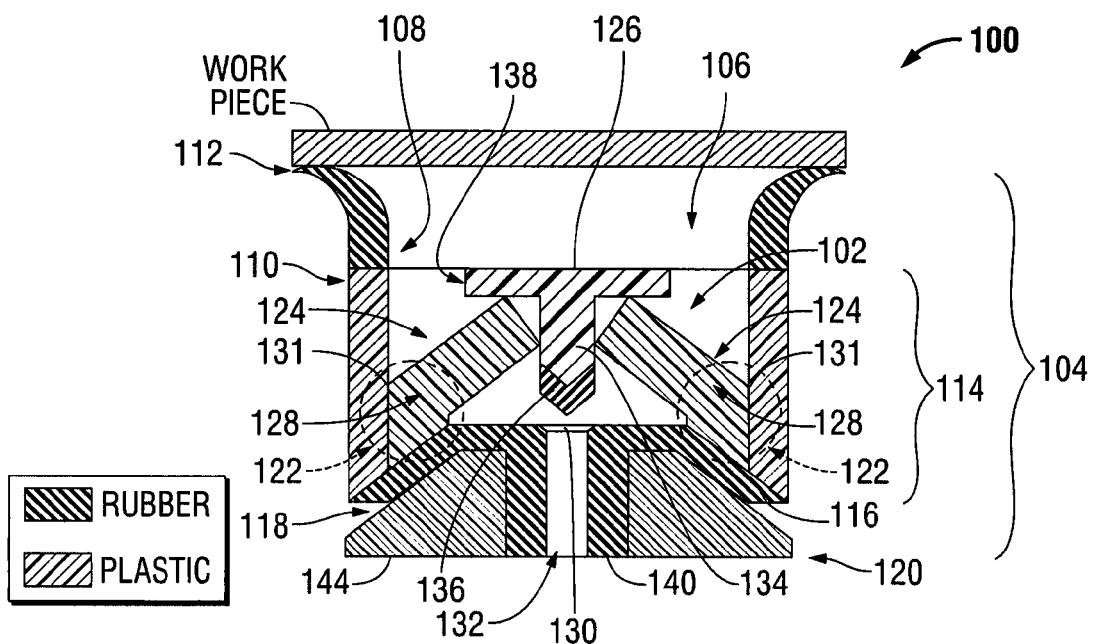

When the lip 112 of the cup member 104 is in contact with a workpiece (not shown), the plug 126 is raised away from the orifice 130 of the tube 140 opening the seal via a hinge action, as shown schematically in FIGS. 2A-2B. FIG. 2A shows the plug 126 sealing the orifice 130 and FIG. 2B shows the plug 126 not sealing the orifice 130. Note how the rubber base 116 stretches over the proximal side 118 of the collar 120. When the lip 112 pushes against a workpiece to be suction grasped, the passive reaction forces from the workpiece push back against the lip 112 of the cup member 104. This force is transferred to the rubber base 116 of the cup member 104; the rubber base 116 thereby stretches over the plastic collar 120 allowing the assembly to compress. The collar 120 acts as a pivot for the plastic hinges 128 located inside the cup member 104, causing them to rotate. The edges of the hinges 128 slide along the underside of a plastic flange 138 attached to the plug 126, and their rotation raises the plug 126 away from the orifice 130 of the suction tube 126. Note that the side of the cup member (i.e., the rigid cylinder 114) is plastic to maintain the diameter of the cup member 104 and prevent the workpiece from crushing the plug 126. Thus, the valve 102 self-opens (i.e., passively actuates) under the small compressive force from a workpiece on the lip 112 and thereby self-seals (hence no suction force at the lips 112 when the valve 102 is closed) when the cup member 104 is not in contact with the workpiece.

Figure 2C:
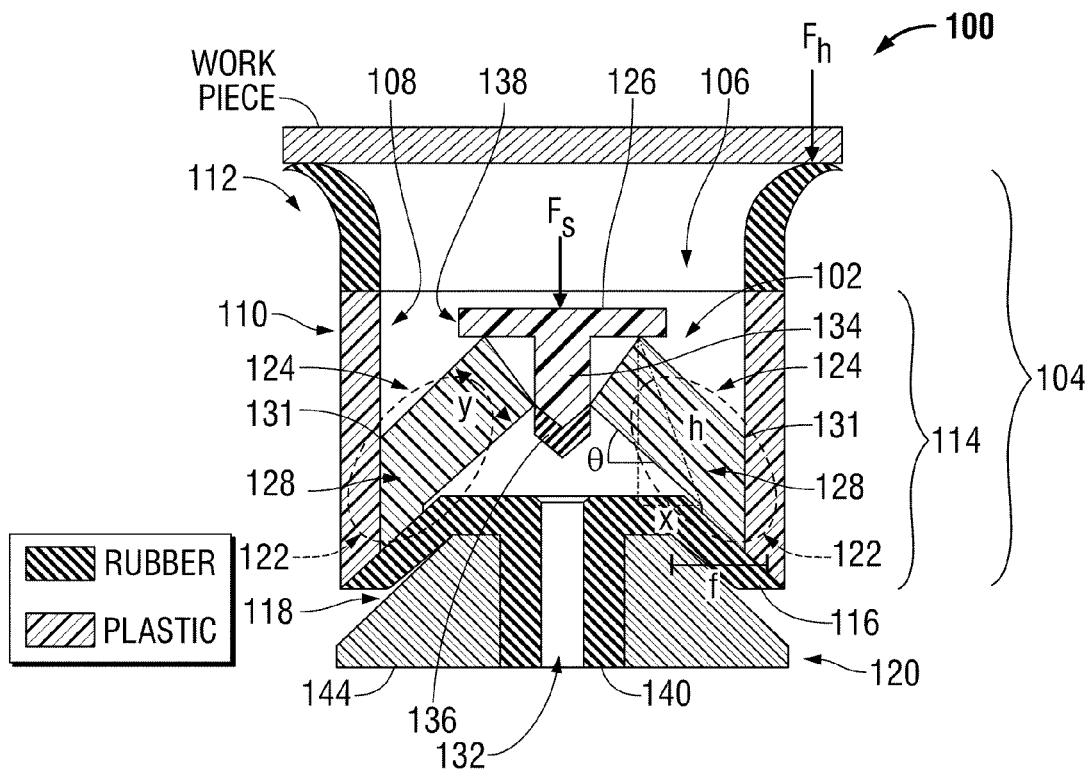
FIG. 2C shows a cross-sectional schematic view of the suction gripper of FIGS. 1A-1B in an open plug position and showing the vector forces in accordance with an embodiment of the present disclosure.

The suction gripper 100 has various configurations to control the plug's 126 position and the maximum achievable force imparted to the workpiece. This is primarily due to the springs 137 located inside the cup member 104. To maintain the open position of the valve 102, the springs 137 must be held in tension. If the suction force is the only force holding the workpiece, then the force required to maintain the springs' 136 position subtracts from the suction force imparted on the workpiece. However, the suction force is mechanically leveraged against the force of springs 137 based on the length of the hinges 136, which is controlled by the diameter of the rigid cylinder 114. A larger cylinder 114 allows longer hinges 136, giving the suction force a greater mechanical advantage, thereby reducing suction force lost to the springs 137. In some embodiments of suction gripper 100, a design goal is to minimize the size of the rigid cylinder 114 prompting the preferable use of the hinges 128 having maximal effectiveness. For example, based on a minimum manufacturable wall thickness of 1.02 mm, inner diameter of the orifice 130 of 1.59 mm, and minimum part spacing of 0.13 mm, the internal geometry of the suction gripper 100 may be designed to a small size, as shown in FIG. 1B. A maximum plug 126 displacement may be displaced a displacement equal to orifice 130 diameter was deemed appropriate based upon intuition, and the springs 137 were designed to be strained no more than 50% so as to not approach their breaking limit. To illustrate the leverage tradeoff, the effective pressure loss is plotted for a range of cup diameters. First, the horizontal distance (x) from the fulcrum (the corner of the collar 120) to the contact point between the hinge 128 and the flange 138 (the upper corner of the hinge) was computed by:

$$x = h\cos\left(\theta + \sin^{-1}\left(\frac{y}{h}\right)\right) \quad (1)$$

where the geometric parameters are shown in FIG. 2C. The variable h denotes the height of the upper corner of the hinge 128 from the undeformed base 116, y denotes the thickness of the hinge 128 in the region that contacts the flange 138, and θ denotes the angle of the hinge 138 from the horizontal. Assuming a linear stress/strain relationship near the known strain valve of 0.5 (hyperelastic material), the spring force $F_s$ is given by:

$$F_s = 2\frac{S_a}{S_E}E_s A_s, \quad (2)$$

where $E_s$=known tensile modulus at $S_E$, the known strain data point, $S_a$=actual spring strain, and $A_s$=area of each spring. The force of hinge 128 ($F_h$) was then computed by using the mechanical advantage of the lever given by:

$$F_h = \frac{x}{f}F_s, \quad (3)$$

where f is the distance from the fulcrum to the side of the cup member 104 where the workpiece force acts. Finally, the pressure loss due to the springs 137, ΔP, was computed by dividing the hinge force, $F_h$, by the contact area of the cup, $A_c$, and is given by:

$$\Delta P = \frac{F_h}{A_c}. \quad (4)$$

Figure 3:
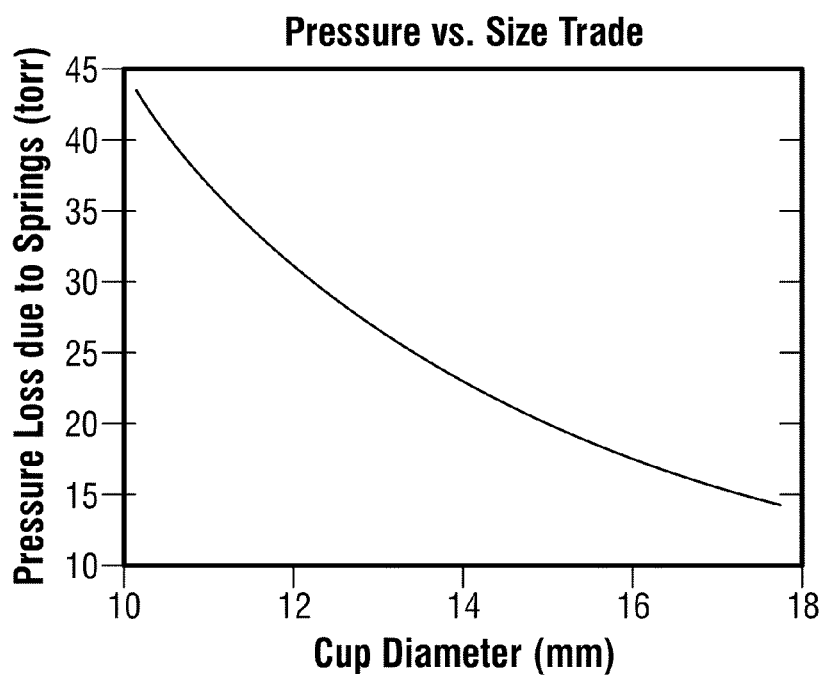
FIG. 3 is a graphic showing the prophetic pressure tradeoff of the expected pressure loss due to the spring for varying cup diameters for the suction gripper of FIGS. 1A-2B in accordance with an embodiment of the present disclosure.

FIG. 3 shows the expected pressure loss due to force resistance of springs 137 for varying diameters for the cup member 104. Using this analysis, in some embodiments, an outer diameter of 14 mm of rigid cylinder 114 around the cup sides may provide a sufficient tradeoff between size and pressure loss. This was about 4% of the expected pressure based on commercially available suction cup ratings.

Finite Element Analysis

Figure 4A:
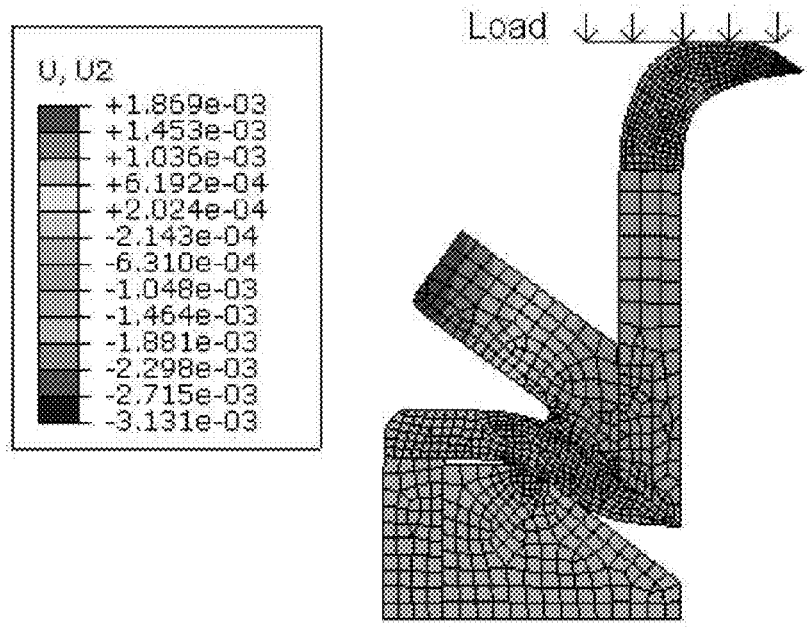
FIGS. 4A-4C show finite element analysis of the cross-section of the cup member of the suction gripper of FIGS. 1A-1B in accordance with an embodiment of the present disclosure.

To illustrate the behavior of the suction gripper 100 under load, a finite element analysis was performed. First, a simple 2-D beam was modeled under a uniaxial load for each material. Material data from the Objet™ website were used to create each beam model. To validate material model parameters, a 50% strain test of each material was performed to ensure predicted stresses matched simulated stresses to within 5%. Once appropriate material models were established, the properties were used to build a geometrically accurate axisymmetric model of the cup without the internal structures. This model was then used to validate a 2-D model of the cup including the hinge. FIG. 4A shows the vertical displacement results of this 2-D model. The vertical displacement data facilitated the determination of a sufficient height for the rigid cylinder 114 and the center extrusion of the support material excavation tool. While the final angle of the hinge 128 may be estimated analytically based on the angle of the proximal side 118 of the collar 120, the plug's 126 vertical offset relative to the contacted workpiece was less easily predicted when there are unknown compression characteristics of the lip 112 and rubber base 116. Based on the finite element model, a height of 6.35 mm was determined to be appropriate for the inner surface 108 of the cup member 114 (This does not include any part of the lip 112. Also, note that the outer surface 110 is longer than the inner surface 108 of the rigid cylinder 114. This dimension refers to the inner wall, i.e., inner surface 108). This would minimize the overall cup size and facilitate the prevention of crushing the plug 126, e.g., by contact with a curved workpiece.

Figure 4B:
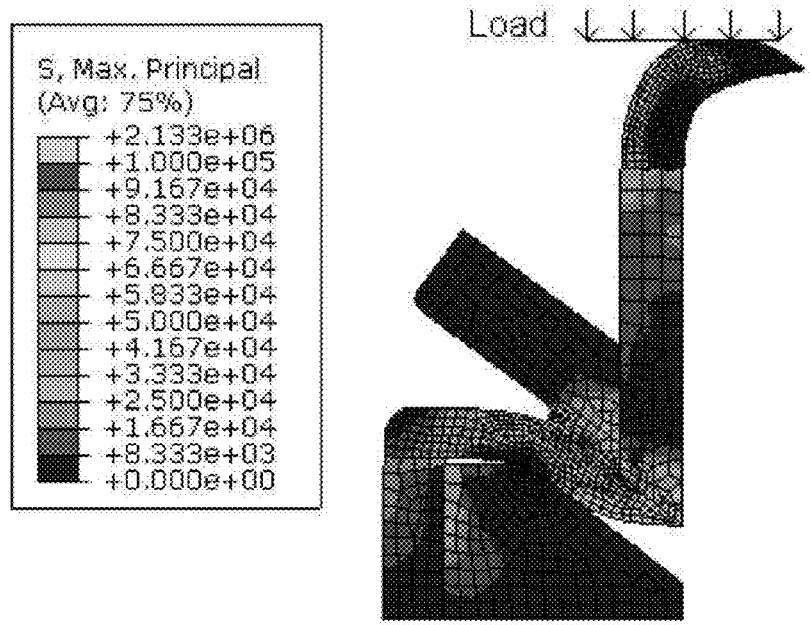
Figure 4C:
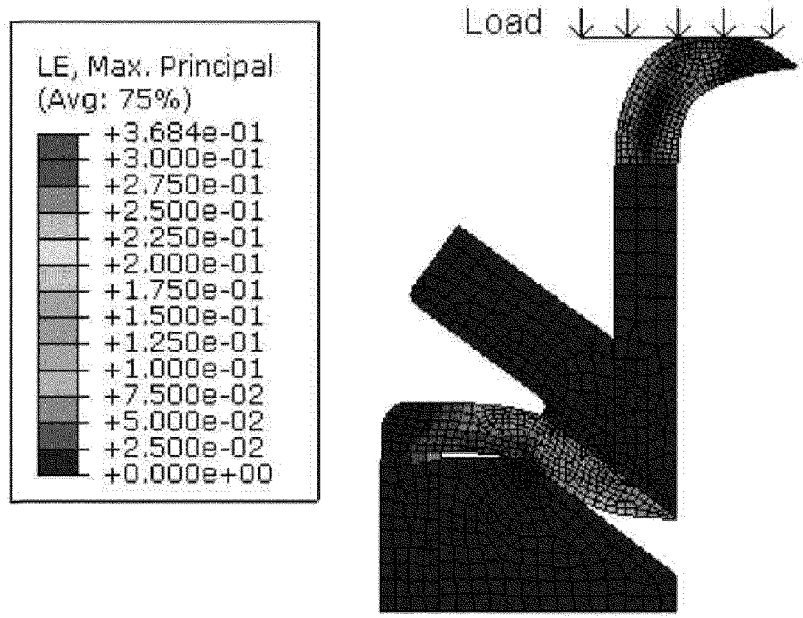

This data also helped determine an excavation tool extrusion height of 3.8 mm to appropriately constrain the plug while permitting sufficient displacement for support material excavation. In addition to vertical displacement, maximum principal stresses and strains were analyzed to ensure that the design and materials could adequately support potential compressive loading. FIGS. 4B-4C show these results. A stress field analysis revealed stress concentrations at the inside corner of the cup member 104 where the hinge, cup side, and cup base meet. However, the model indicated that despite the stress concentration, the joint would not fail under compressive loads up to at least 60 N, in some embodiments. In some embodiments, while the rubber components were rated to a failure strain of 218%, strains in both the lip 112 and the base 116 were verified to be less than 100%. In some embodiments, knowing the hinge's 128 displacement relative to the unstressed spring 137 height yielded a strain of approximately 50% at maximum cup member 104 compression, which was well within safety parameters. This may be used to set the maximum displacement for the plug 126 at approximately one orifice 130 diameter (1.6 mm) above the base 116 to allow pressure equalization above and below the plug 126, thereby eliminating the possibility of the suction forces closing the valve.

Figure 5:
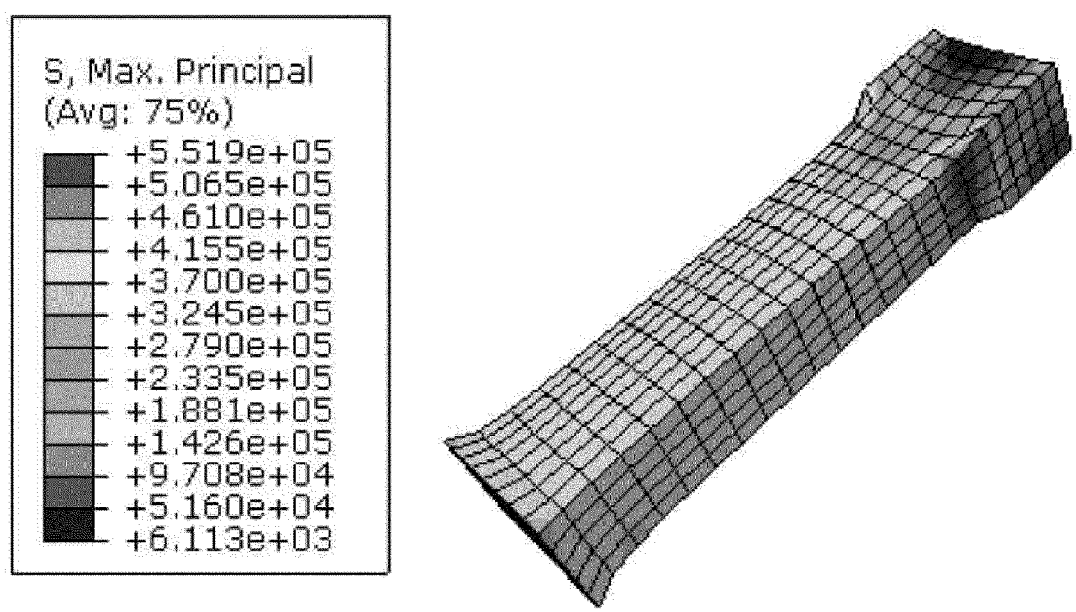
FIG. 5 shows a finite element analysis of the spring depicting the maximum principal stresses in accordance with an embodiment of the present disclosure.
Figure 6A:
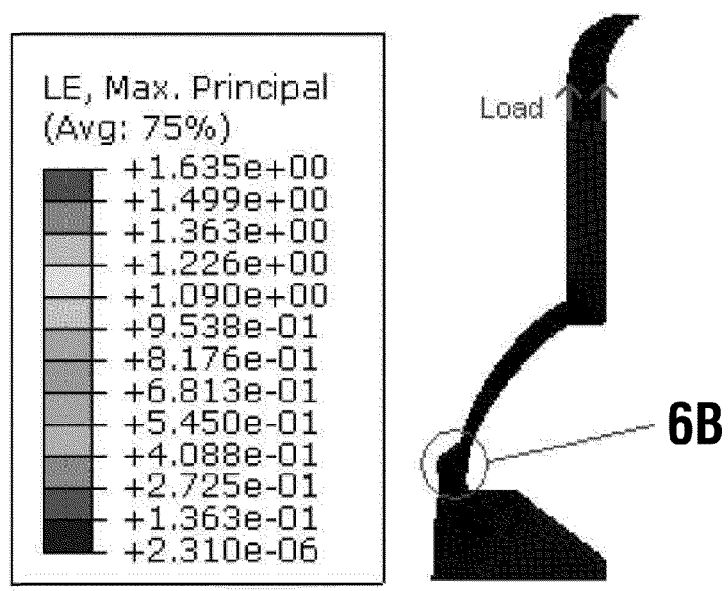
FIGS. 6A-6B show axisymmetric static finite element analysis of the cup member showing the maximum principal strain in accordance with an embodiment of the present disclosure.
Figure 6B:
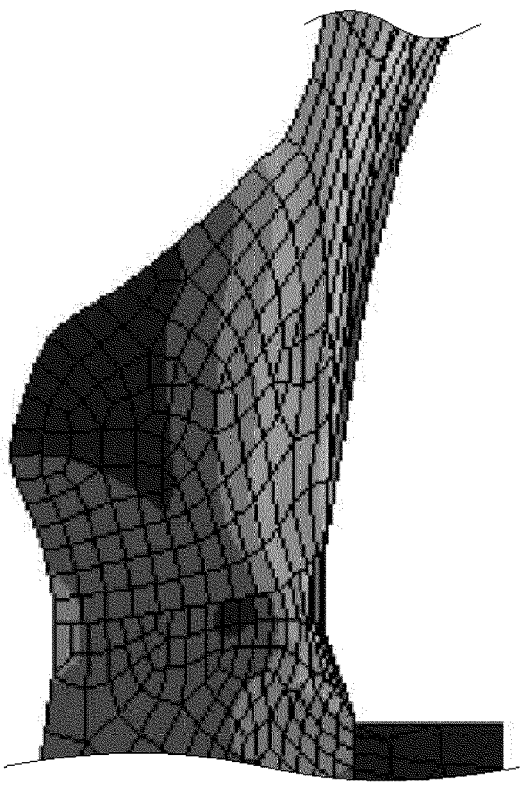
Figure 7A:
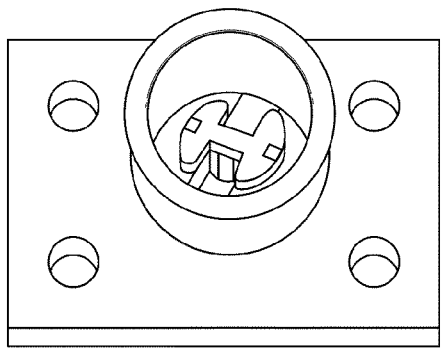
FIGS. 7A-7C show parts manufactured to make the suction gripper of FIGS. 1A-1B in accordance with an embodiment of the present disclosure.

A 3-D model of the spring 137 was created to determine the best method for attaching the spring 137 to the flange 138. Test geometries showed that attachment at the top surface of the spring 137 was inconsequential compared to the sides of the spring 137. Therefore, the top of the spring 137 was designed to be flush with the top of the flange 138 thereby maximizing the length of the spring 137 to reduce strain and thus stresses within the spring 137 for an equivalent maximum displacement. Further, an average attachment area of 1.2 mm² on each of three sides was determined to be sufficient to handle the stresses on the flange-spring interface. FIG. 5 shows the stress field on a 3-D model of the spring 137 given the described boundary conditions. To estimate any potential for failure under tensile loading, another finite element model was constructed. Because no time-dependent data could be found for the materials used, a static model approximated the physical result. Further, the suction tube's 140 break point appeared to be similar for both the permanently open cup member (i.e., without a valve) and the self-sealing suction gripper 100, so an axisymmetric model without internal structures was constructed. Two 3 N concentrated vertical forces were applied to the upper corners of the suction gripper sides to simulate the loading conditions on the base and tube, for a total tensile load of 6 N. FIGS. 6A-6B shows these loads as well as the maximum principal logarithmic strain. The region of interest has been enlarged FIG. 6B for better viewing. Loads greater than 6 N caused strains greater than the "elongation at break" material data for this embodiment Fabrication of an Embodiment of the Suction Gripper The technology used to fabricate the flexible rubber with and the solid plastic parts were: PolyJet™ by Objet™. This technology facilitates the production of parts and assemblies from two different materials in the same build, including plastic and soft rubber for this design. However, other sufficient technologies may be utilized to make the suction gripper 100 of FIGS. 1A-2B. For fabrication, the Objet™ materials FullCure® 830 VeroWhite and the new TangoPlusBlack® were used for the plastic and rubber parts, respectively. FullCure® 830 VeroWhite has a published modulus of elasticity of 2.495 MPa, and TangoPlusBlack® may be near that of FullCure® 930 TangoPlus, which is hyperelastic with a tensile modulus of 0.263 MPa at 50% strain. This is the approximate maximum strain expected on the springs 137 using the dimensions discussed above in some embodiments of the present disclosure. A minimum wall thickness in some embodiments for parts on Objet's™ Connex 500 is approximately 1 mm. For modularity purposes, each cup member 104 may be epoxied to a test slide manufactured using a Dimension Elite rapid prototyping machine. To prevent leaks, the slides were sealed with a layer of epoxy. A single cup mounted on a test slide is shown in FIG. 7A.

Support Material Excavation

Figure 8A:
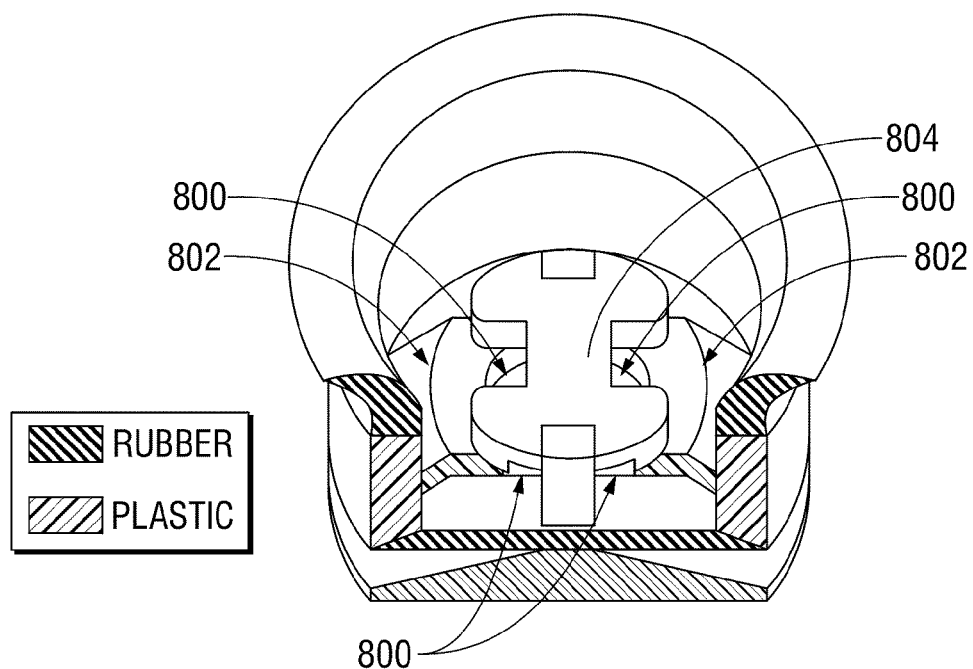
FIGS. 8A-8B show aspects of the manufacturing of the suction gripper of FIGS. 1A-1B in accordance with an embodiment of the present disclosure.
Figure 8B:
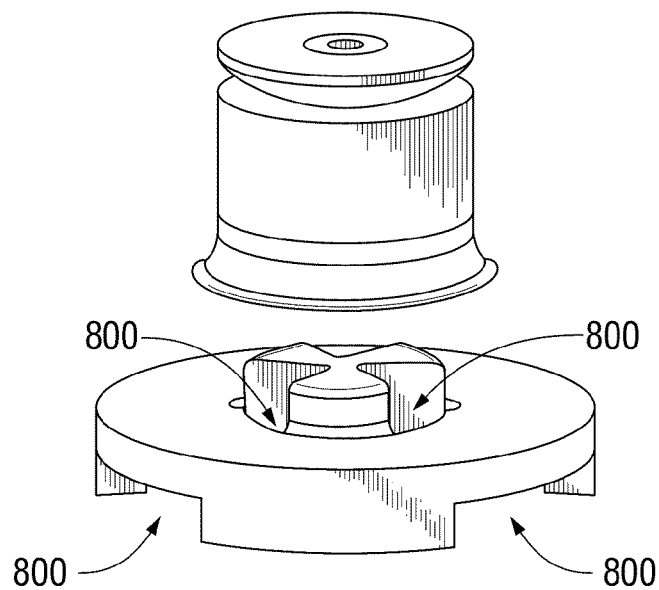

During the manufacturing process, support material was used to separate layers and prevent parts from fusing together. For example, a single layer of support material measuring 0.13 mm was used between the plug 126 and the suction tube 140 opening. The support material used is not dissolvable, but is removable by water pressure during post-processing. The cup member 104 may be manufactured apart from its underlying structure to enable adequate access to areas containing support material. Channels 800 shown in FIGS. 8A and 8B may be designed into the flange (e.g., the flange 138) to allow water the most direct path possible to the plug region (see FIG. 8A). The channels 800 were also made in the hinges 802, and the flange 804 was designed to be as small as possible for this same purpose. Because a standard water jet provides enough pressure to break the springs, causing the plug 126 and flange (e.g., a flange 138) to become detached from the cup, a Waterpik™ with water pressure control was used in combination with dental tools to remove the support material. Finally, an excavation tool was designed to allow the cup member to be compressed during excavation (see FIG. 8B) while limiting the stresses on the springs 137 due to the water pressure. During excavation, the cup member is placed over the central extrusion of the tool. When compressed, the small gaps between the internal structures of the cup are opened, allowing more effective water penetration. However, the force of the water stream on the plug is directed into the tool rather than through the springs, thereby minimizing the risk of breaking. Channels in the central extrusion and in the base allow water to flow through the structure.

Flexible Array

Referring to the drawings, FIG. 9 shows a flexible array 900. A plurality of suction grippers 902a-d are disposed on a substrate 904 to form a flexible array 900. Each of suction grippers 902a-d may be the suction gripper 100 of FIGS. 1A-1B. The flexible array 900 allows suction grippers 902a-d to be arranged in a flexible array for grasping workpeices. Plastic ribs 906a-d may support each of suction grippers 902a-d on the flexible substrate 904, providing a thin rigid surface to resist the passive reaction forces from the workpiece, enabling the cup to compress and thus open. The ribs 906a-d are connected to one another by flexible rubber forming the flexible substrate 904. The flexible substrate 904, in other embodiments, may be a rubber strip having suction tubes embedded therein (not shown in FIG. 8). One or more portions of the flexible array 900 may be manufactured using an Objet™ rapid prototyping machine using FullCure® 830 VeroWhite and TangoPlusBlack® materials.

Force Displacement Testing

Figure 10:
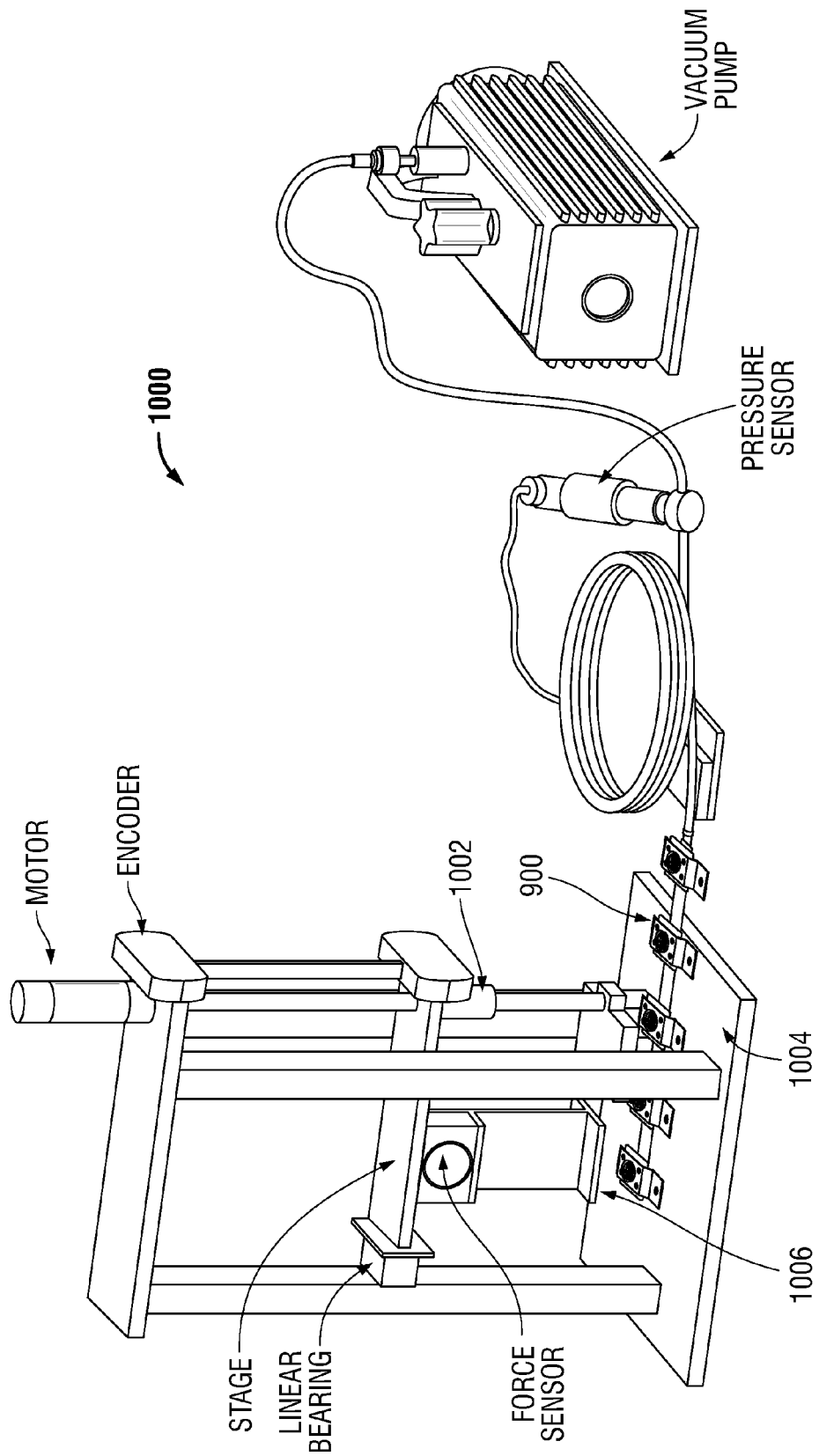
FIG. 10 shows an experimental setup to obtain force versus displacement data for a suction gripper with and without a plug in accordance with an embodiment of the present disclosure.

To record force and displacement data under both compression and tension, a testing apparatus 1000 shown in FIG. 10 may be utilized. The assembly 1000 achieves linear motion by utilizing a lead screw assembly 1002, which was powered by a Maxon A-max 32 motor and Maxon GP32 planetary gearhead. Displacement was measured by a US Digital linear encoder with a resolution of 0.05 mm per step. A JR3 6-axis force/torque sensor with a maximum load of 50 N was attached in-line with the stage to measure both tensile and compressive forces. A dSPACE DS1103 controller board (dSPACE, Inc.) controlled the motion and also recorded the force and displacement data. One of the ribs 906a-d from the flexible array 900 of FIG. 9 may be mounted to the bottom plate 1004, and a compression plate 1006 with a glass surface was mounted to the moving stage. A Robinair two-stage 1.5 cfm vacuum pump (Model: 15150, Manufactured: China) supplied the suction force.

Seal Quality Testing

Figure 7B:
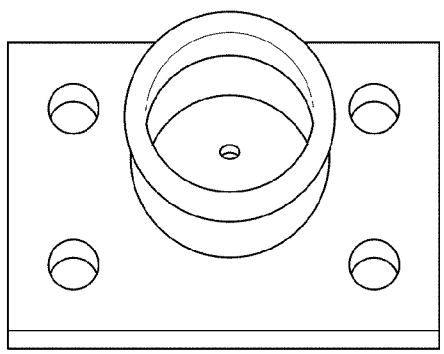
Figure 7C:
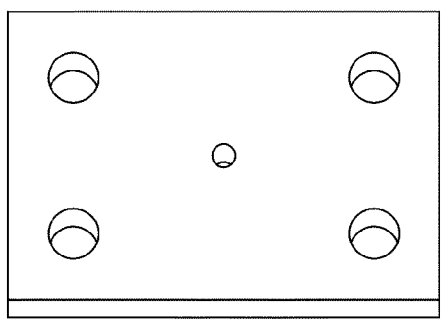

FIG. 12 shows a test setup to test flexible array 900 of FIG. 9 using the suction gripper 100 of FIGS. 1A-1B. The in-line pressure of various combinations of self-sealing cups, open cups (identical to the self-sealing cups but without the internal structures), and sealed "blank" slides (as a control group) were tested for comparison (see FIGS. 7A-7C). A pressure transducer from Gems sensors (Part number: 2600SAG100EG3UB, Manufactured: Plainville, Conn., USA) was used to measure the pressure in the suction tube 904. Data were obtained for a completely sealed array (i.e. each of the four array slots contained a blank slide); 1, 2, 3, and 4 self-sealing cups (e.g., suction grippers 902a-d), with the remaining slots filled with blanks (e.g. the position closest to the pump contained a self-sealing cup, and the remaining 3 positions in the array each contained a blank slide); and 1, 2, 3, and 4 open cups, with the remaining slots filled with blanks. The pressure in the line was also measured for an open line (when the pump was not connected to the flexible array), and when the pump was turned off (for atmospheric reference). In addition, the variation in seal quality among individual suction grippers 902a-d was determined. Six different self-sealing cups were tested individually in the flexible array, with the remaining three slots sealed with blank slides. Pressure data were obtained for each cup in its nominal position prior to workpiece contact, during workpiece contact, and after release from the workpiece. This was done to verify that quality seals could be reacquired after being opened due to contact with a workpiece. A glass slide was used as the contact workpiece in each case.

Force Displacement Results

Figure 11A:
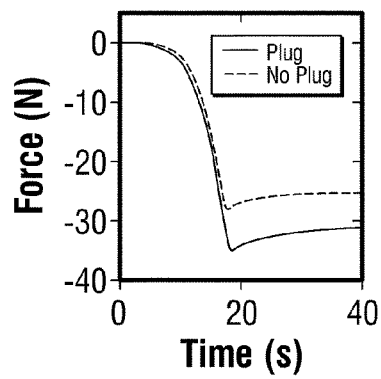
FIGS. 11A-11B, 12A-12B, and 13A-13B show graphics illustrating the result of the experimental setup of FIG. 10 in accordance with an embodiment of the present disclosure.
Figure 11B:
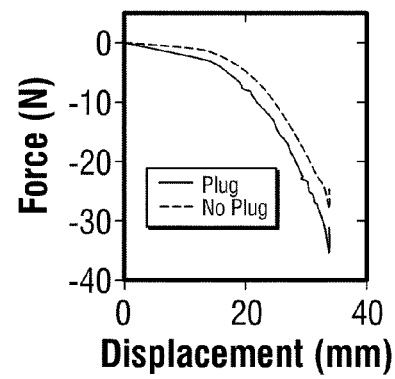

A comparison may be used to measure of the effect of the internal cup structures on the forces required to compress the cup, e.g., the suction gripper 100 of FIGS. 1A-1B. To conserve energy, it is expected that power to the suction pump will remain off until the workpiece has been contacted, and the suction grippers 902a-d are compressed. The compression plate 1006 may be placed just above one or more uncompressed suction grippers 902a-d. Then, for each suction gripper of suction grippers 902a-d, the compression plate 1006 may be lowered at a rate of 0.25 mm/s to a maximum depth of 3.5 mm. FIGS. 11A-11B show the results of this test. As shown, the absolute displacement of the compression plate 1006 was identical for each test, but slightly different levels of compression in the rubber gasket underlying each slide caused different relative displacements. However, if the relative displacements are compared on equal footing by referencing the initial force increase, the internal cup structures of suction grippers 902a-d appear to add approximately 2 N of required force to compress a suction gripper 902. Note that the suction grippers 902a-d experienced some relaxation after reaching full compression due to the viscoelastic nature of the TangoPlusBlack® material.

Figure 12A:
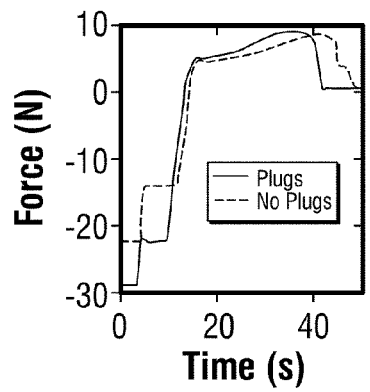
Figure 12B:
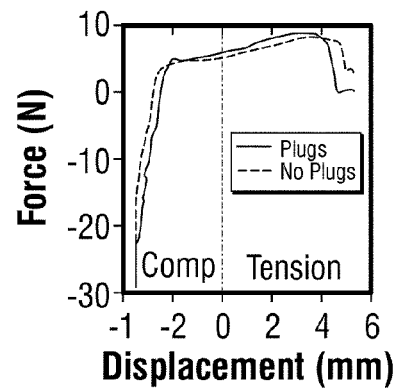

Once the initial grasp has been made, the vacuum pump is turned on to engage the suction. FIGS. 12A-12B show a comparison of the performance between a plugged suction gripper 902 and an unplugged suction gripper 902. After the initial compression (negative tensile force), the pump was turned on, causing an initial decrease in compressive force (visually a rise to a smaller negative tensile force). Then the compression plate was raised at a rate of 0.25 mm/s to a maximum height of 5.5 mm above the cup's neutral position, sufficiently high to cause the cup to disconnect. Note that the pressure in the line was measured to be 72 torr, for a load capacity of 691 ton based on a measured laboratory pressure of 763 torr. As FIGS. 12A-12B show, the actual performance between the plugged suction gripper 902 (solid) and the unplugged suction gripper 902 (dashed) was relatively consistent above the neutral point. Each exerted a maximum force of approximately 9 N. As the compression plate pulled the suction gripper 902 above its neutral position due to the suction force, the rubber tube 904 was unable to handle the tensile forces demanded upon it, as predicted by the finite element analysis described supra. The tube 904 stretched to the point of failure before the suction gripper 902 released its hold on the workpiece. An analysis of potential ways to mitigate this failure is described infra.

Figure 13A:
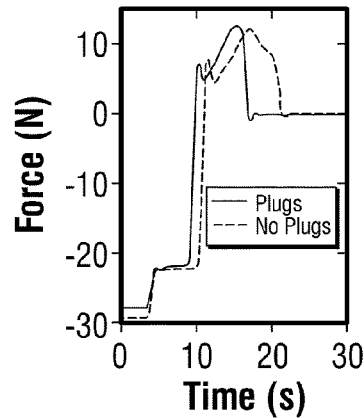
Figure 13B:
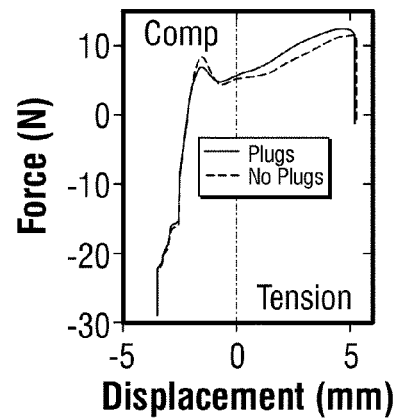

To determine the maximum potential holding force another test was performed where the compression plate was pulled at a rate of 1.25 mm/s. This reduced the viscoelastic stretching effect and caused the cup to disengage at the lip 112. FIGS. 13A-13B show that for this test, a maximum force of 12.5 N was achieved, demonstrating the potential for the design to perform on par with commercially available cups.

Seal Quality Results

Figures 14, 15:
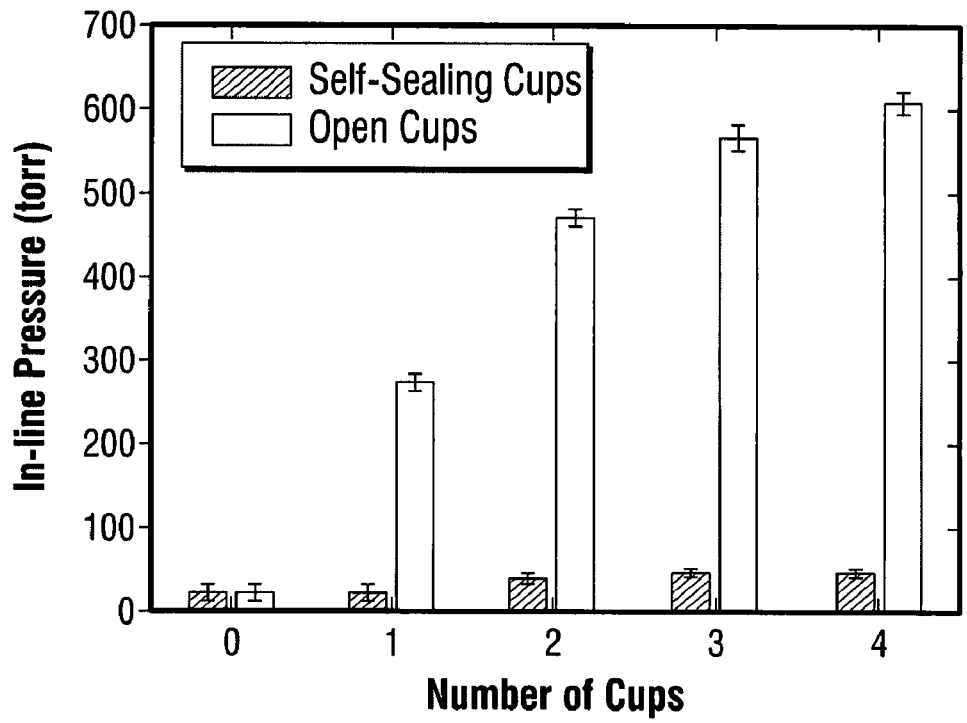
FIG. 14 shows the average in-line pressure for various configuration of the suction gripper of FIGS. 1A-1B in accordance with an embodiment of the present disclosure.
FIG. 15 shows a comparison of various cup members of a suction gripper in accordance with an embodiment of the present disclosure.

As described supra, the in-line pressure of the flexible array 900 was measured for various combinations of self-scaling cups (i.e., seal-sealing suction grippers), open cups (i.e., seal-sealing suction grippers, and sealed blank slides (i.e., seal-sealing suction grippers. For example, suction gripper 900 may be measured in various configurations. FIG. 14 shows the pressure data in torr for each combination averaged over 5 seconds. In addition, the open line (not connected to the flexible array) was tested to determine the pressure in the case of an infinite number of open suction grippers (not shown in an infinite configuration). It yielded a pressure of 685±12 torr. Note that atmospheric pressure in the laboratory measured 758±8 ton. Referring to FIG. 17, the data shows that the open suction grippers provide a small inlet size capable of restricting the flow enough to provide some pressure differential in relation to the atmosphere. This effect tapered quickly as more open suction grippers were added to the flexible substrate 904 were added. However, the valve seals within the self-sealing suction grippers 900 were able to prevent enough flow that the device maintained a pressure differential of 93.8% of atmospheric pressure with four cups.

This illustrates the quality of the self-sealing action of the suction grippers 900 when it is considered that nearly half of this leakage was contributed by the test setup alone, as evidenced in the 0 cup control (all blanks). A comparison in the seal quality was also determined among individual self-sealing suction grippers 900. FIG. 15 shows a table 1500 showing the in-line pressures of a single suction gripper of flexible array 900, with sealed blank slides in the other three positions of the flexible array 900. Pressure data were averaged over 5 seconds for each datum in the table 1500. All of suction gripper of suction grippers 900 demonstrated the ability to maintain a quality seal prior to workpiece loading. Each suction gripper of suction grippers 900 was within one standard deviation of the control pressure (see FIG. 14 at 0 cups), where sealed blank slides were used in all four positions as an experimental control. Some variation was expected due to differences in support material cleaning and the quality of the rubber gasket seal underlying each slide. When the glass slide contacted the suction gripper of suction grippers 900, opening the valve, cups A, B, and D exhibited the same behavior as in their nominal positions. However, a hissing could be heard when cups C and F were in contact with the workpiece. This was likely due to a small leak from stretching of the rubber tube connecting the cup to the collar in previous uses. However, despite these leaks, each suction gripper of the flexible array 900 was able to successfully reseal itself upon workpiece release. Cups A and B were slower to respond after contact with the workpiece. This could have been due to a slower viscoelastic response from aging or improper seating of the plug in the tube. Cycling the power to the vacuum pump improved reseal results, probably because the increased air flow forced the plug into better alignment with the tube. In addition, the second test allowed the springs more time to relax their viscoelastic time response. Overall, the self-sealing suction gripper of suction grippers 900 demonstrate the ability to maintain quality seals on the workpiece, and to reseal after contact, although in some cases more time was needed to restore the quality of the reseal.

Workpiece Testing

Figure 16A:
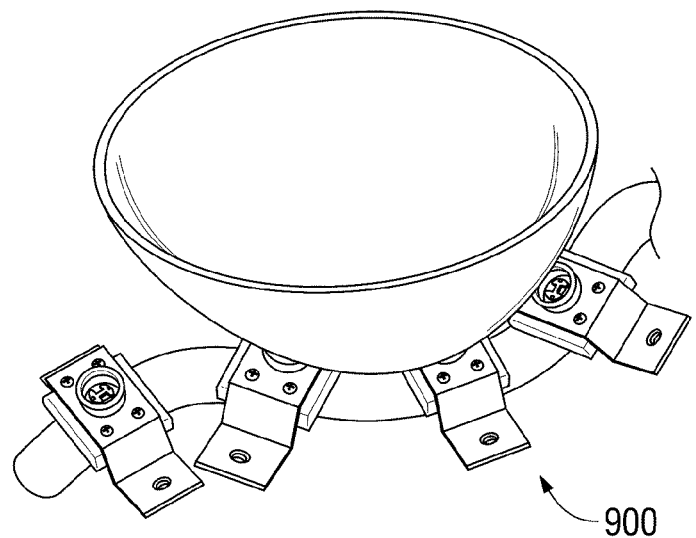
FIGS. 16A-16D show the suction grippers disposed on a substrate as shown in FIG. 9 gripping various workpieces (or objects) in accordance with an embodiment of the present disclosure.
Figure 16B:
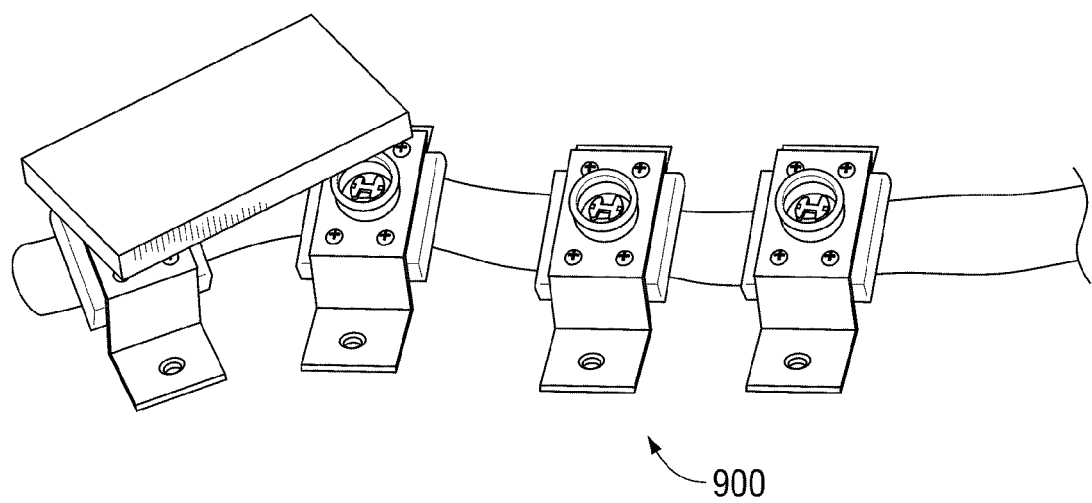
Figure 16C:
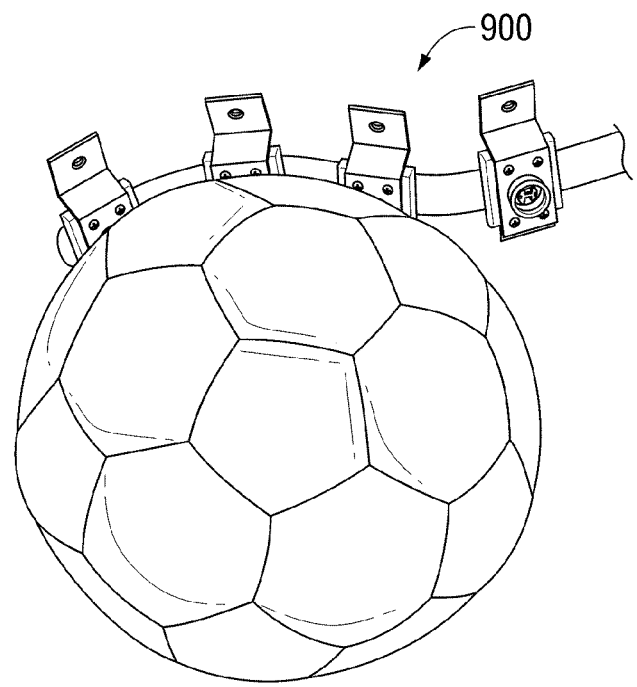
Figure 16D:
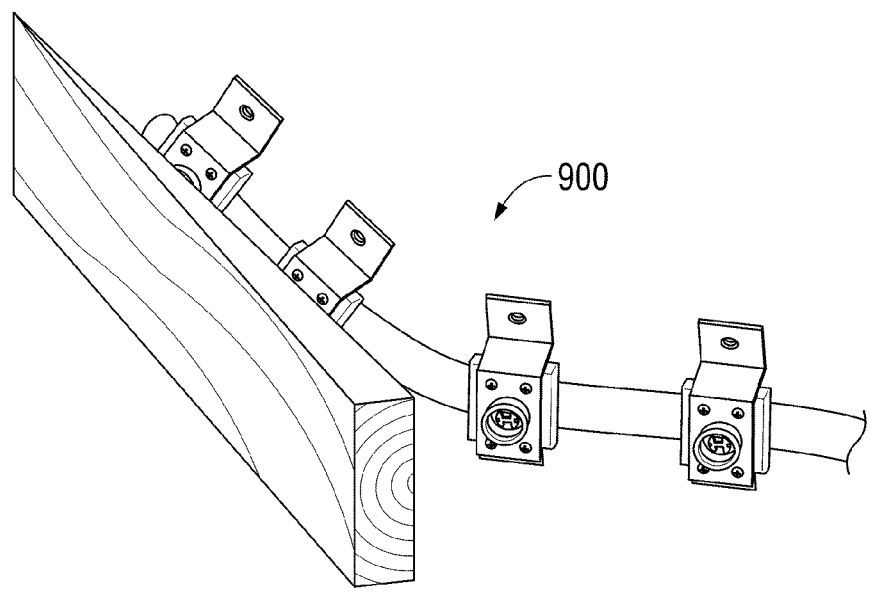

To determine the effectiveness of the concept for manipulating actual workpieces, a large number of workpieces were picked up with suction gripper of suction grippers 900 (see FIGS. 16A-16D). FIG. 16A shows the flexible array 900 gripping a coffee mug; FIG. 16B shows the flexible array 900 gripping a credit card; FIG. 16C shows the flexible array 900 gripping a volleyball; and FIG. 16D shows the flexible array 900 gripping a wooden block. When any suction gripper 902*a-d* is not attached to the workpieces of FIGS. 16A-16D it is self-sealed, i.e., the valve in the respective suction gripper 902*a-d* is actuated closed. The flexible array 900 may be used to supplement mechanical grippers in robotic applications.

Figure 17A:
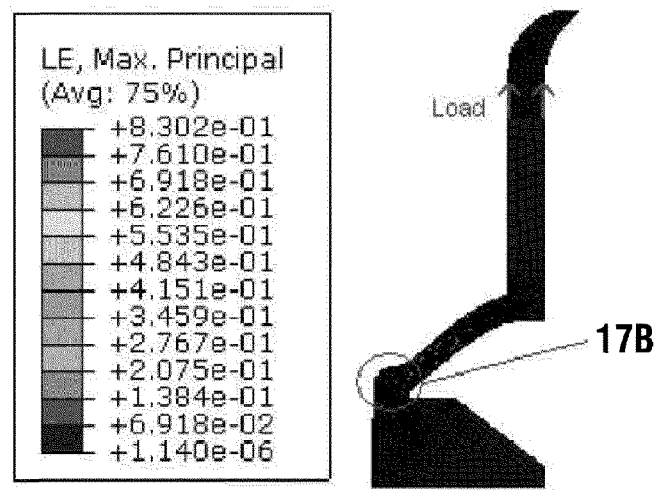
FIGS. 17A-17B show axisymmetric static finite element analysis showing a maximum principal strain for a cup member in accordance with an embodiment of the present disclosure.
Figure 17B:
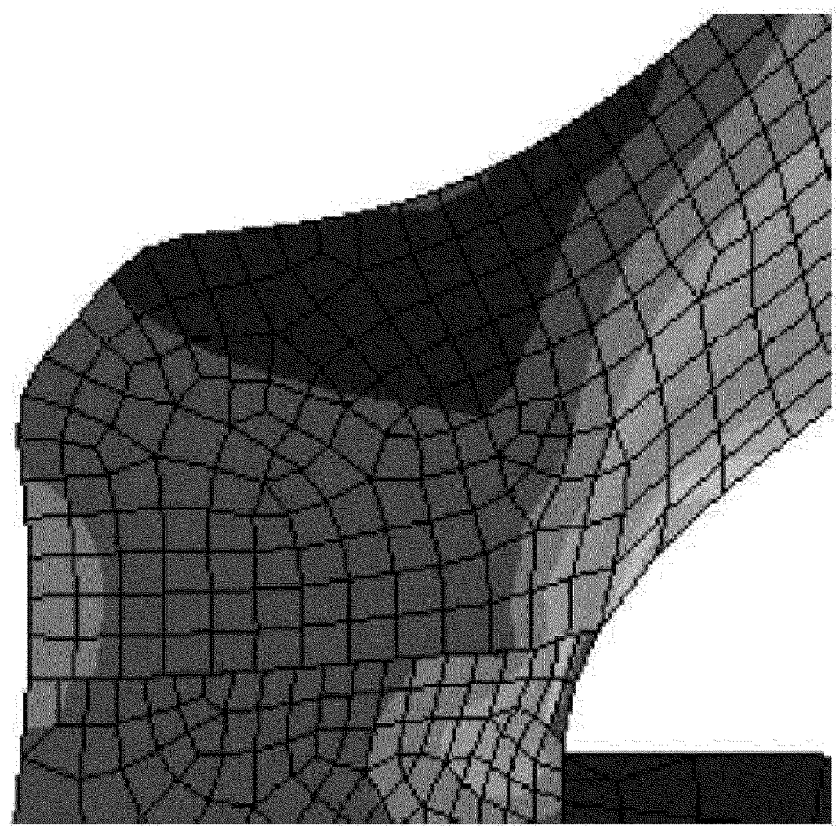

Viscoelastic time response should be accounted for when conducting finite modeling. Thus, if the workpiece were raised infinitesimally slowly, the flexible tube 904 breakable point may be reached, e.g., it may be around 6 N. Alternative materials may be used. The Polyjet™ technology is capable of mixing the TangoBlackPlus® and the VeroWhite® to create "digital materials" with varying durometers and properties. To investigate the effect of using a digital material for the cup base and tube, the axisymmetric model was rerun using the material properties for DM 9860. Two 6.5 N concentrated vertical forces totaling a 13 N tensile load were applied to the upper corners of the cup side (i.e., the rigid cylinder 114 without the lip 112 of to simulate the maximum loading condition expected prior to workpiece release. The results of this model are shown in FIG. 17A-17B. Note that FIG. 17B is an enlarged view of a portion of FIG. 17A. While the model shows that this material is capable of handling the maximum expected load, a stress (and hence strain) concentration is evident at the connection point between the tube and the base. Under the 13 N tensile load, the maximum principal logarithmic strain at this location reaches 0.83, which is close to the listed elongation at break of 0.9. A redesign of this joint or use of an even stronger material may facilitate a more failure tolerant design. However, supporting a static 13 N load would grant sufficient strength for the maximum expected load for the grasper size in this embodiment. Higher loads would not cause the grasper to break because it would become disconnected from the workpiece at the lip prior to breaking.

Figure 18:
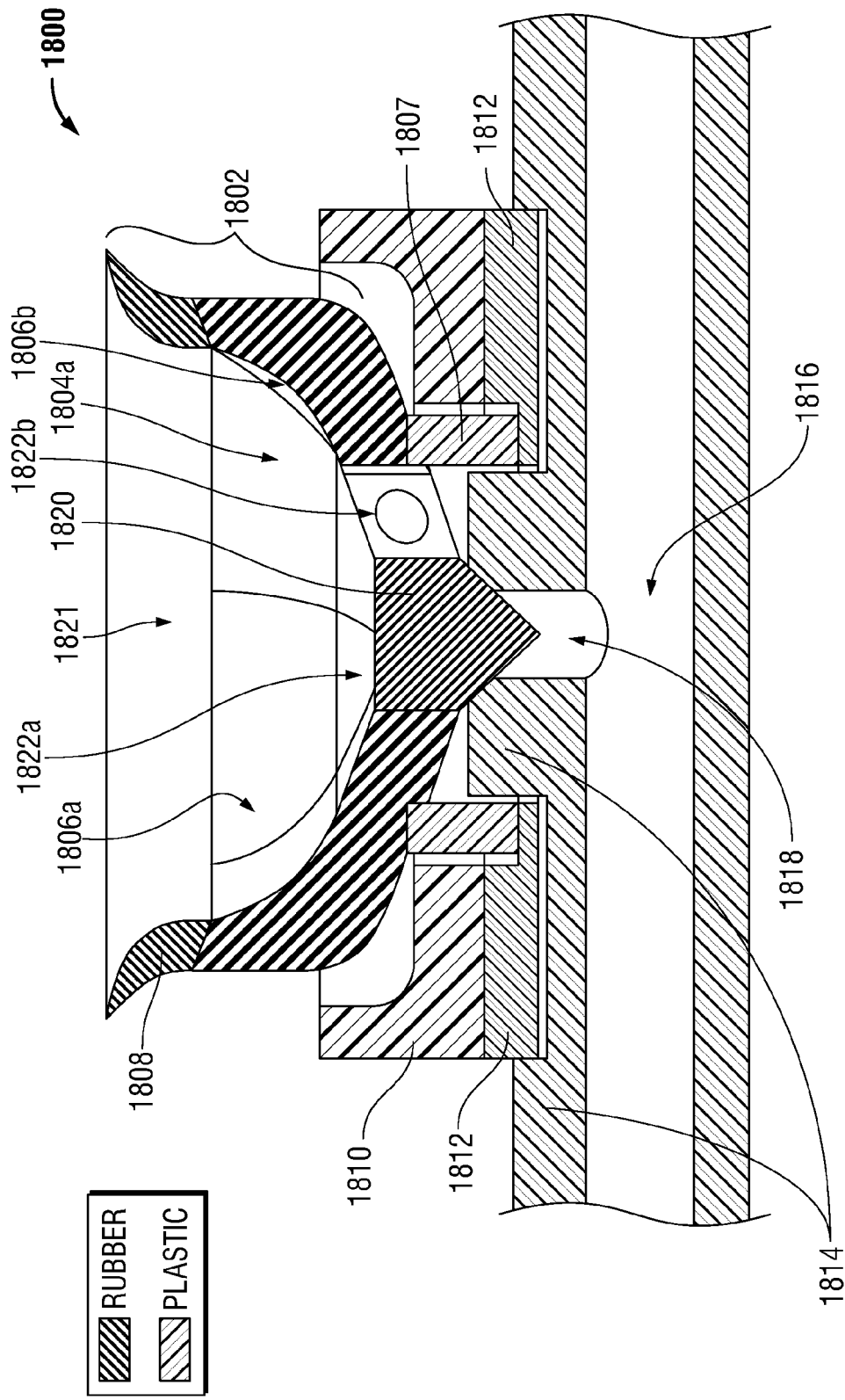
FIG. 18 shows a cross-sectional perspective view of a suction gripper having radial partitions in accordance with an embodiment of the present disclosure.
Figure 19:
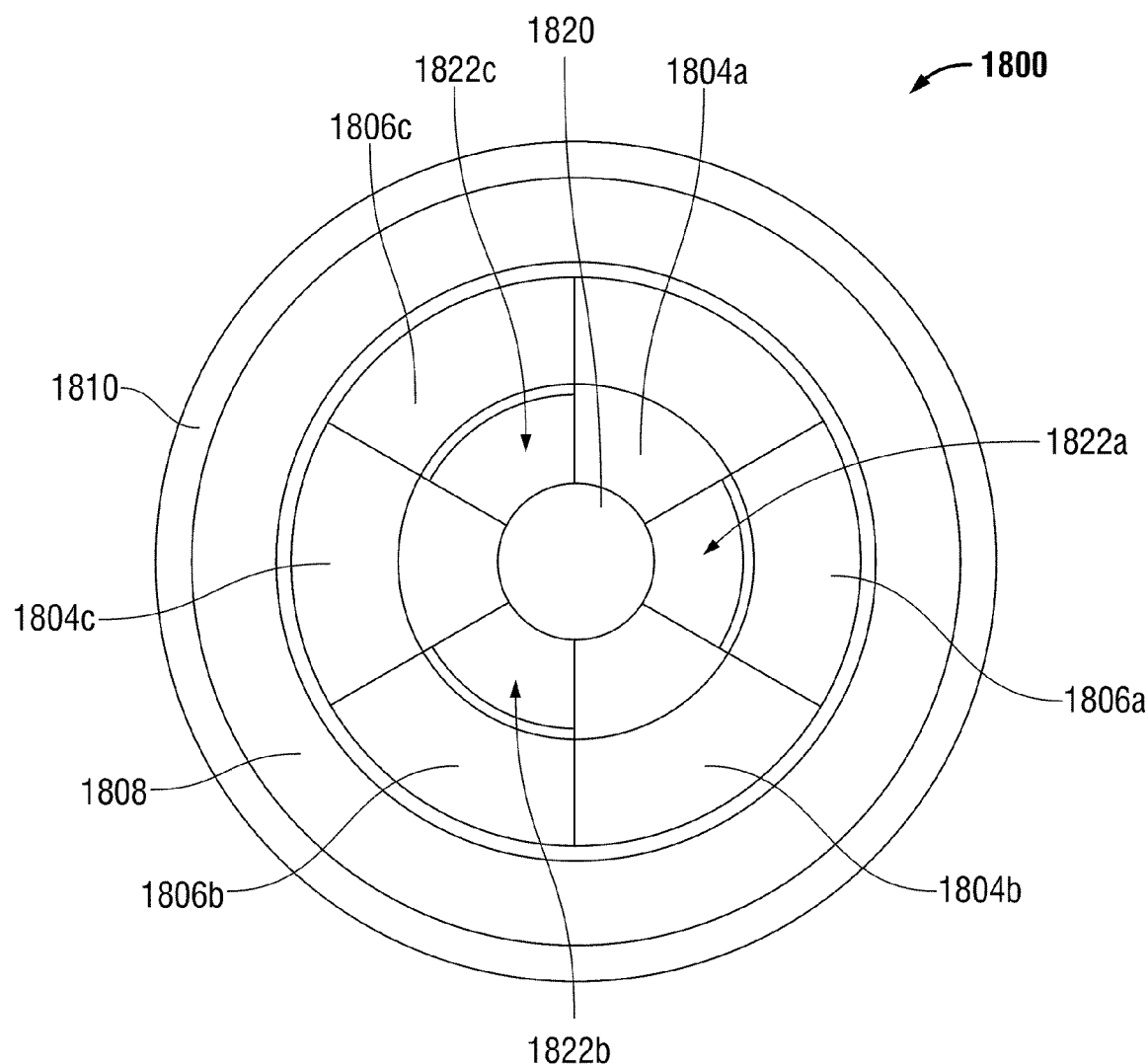
FIG. 19 shows a top view of the suction gripper of FIG. 18 in accordance with an embodiment of the present disclosure.
Figure 20:
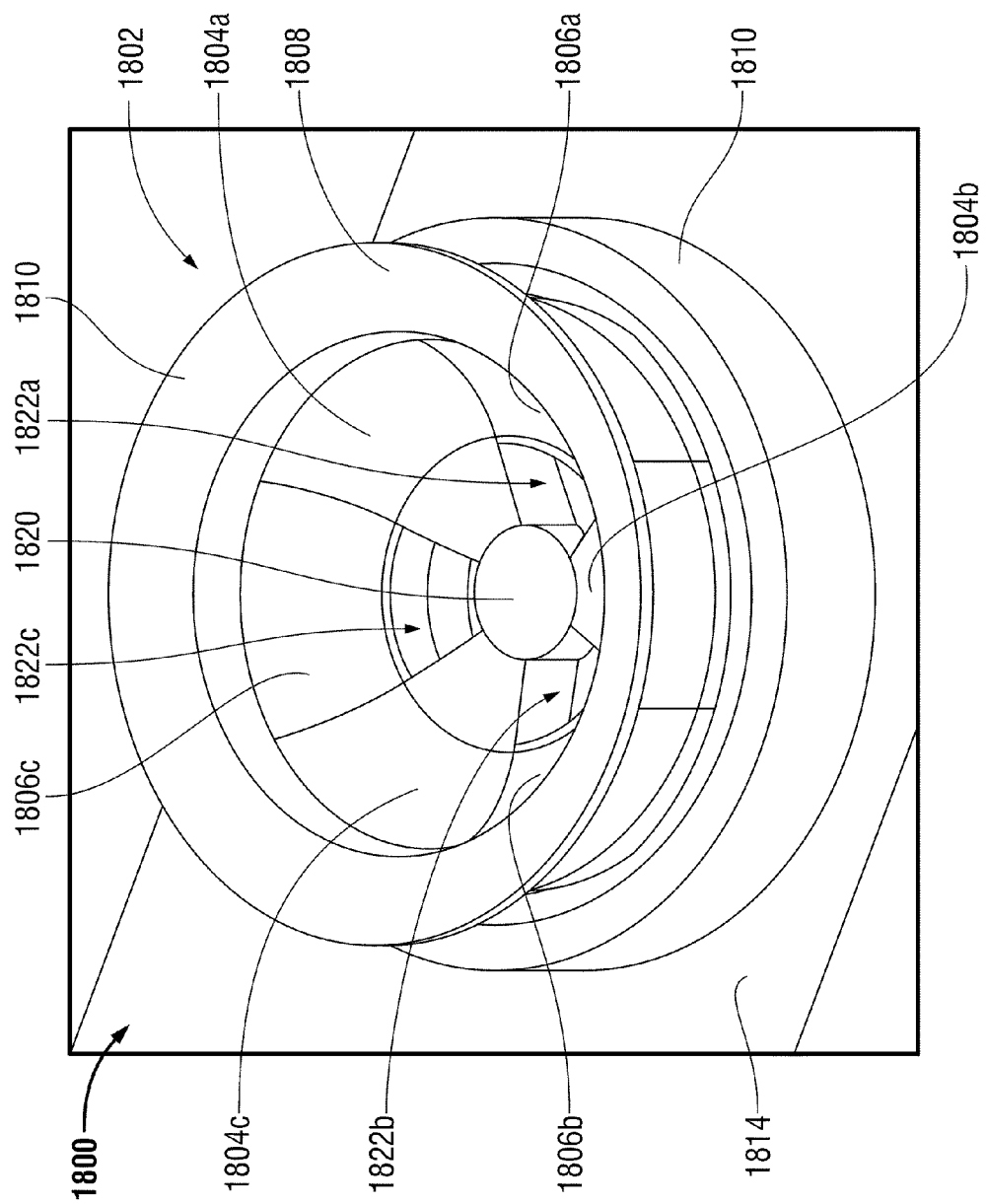
FIG. 20 shows a side-perspective view of the suction gripper of FIG. 18 in accordance with an embodiment of the present disclosure.

Refer now to FIGS. 18, 19, and 20. FIG. 18 shows a cross-sectional perspective view of a suction gripper 1800 having radial partitions in accordance with an embodiment of the present disclosure; FIG. 19 shows a top view of the suction gripper 18000; and FIG. 20 shows a side-perspective view of the suction gripper 1800 in accordance with an embodiment of the present disclosure. The suction gripper 1800 may be used in any suitable fluid, for example: air, water, oil, gases, liquids, viscoelastic fluid and the like. Additionally or alternatively, the suction gripper 1800 may be implemented using any type of fluid, for example: air, water, oil, gases, liquids, viscoelastic fluid and the like.

The suction gripper 1800 includes various radial partitions, including hinges 1804*a-c* (which may be plastic) and sides 1806*a-c* (which may be rubber) see FIG. 19). The cup 1802 also includes a lip 1808 (which may be rubber) to form a seal when pressed against a workpiece. Suction gripper 1800 also includes a collar 1810 (which may be plastic). The collar 1810 is coupled to a base 1812 (which may be rubber) that is coupled to a substrate 1814 (which may be rubber). The rubber base 1812 may be coupled to the substrate 1814 using various adhesives, e.g., tape, glue, bonding, heat bonding, ultrasonic welding, and the like. A suction tube 1816 (which may be rubber) provides suction for suction port 1818. The suction tube 1816 may be made of rubber, a semi-rigid material, or a rigid material to prevent it from being crushed. Additionally or alternatively the suction port 1818 may be made of rubber, a semi-rigid material, or a rigid material to prevent crushing. A plug 1820 (which may be rubber) plugs the suction port 1818. When a force is applied to lip 1808, hinges 1804 rotate along the upper surface of collar 1810 compressing plug 1820 and sides 1806. As plug 1820 is lifted out of the suction port 1818, air is pulled through holes 1822*a-c* thereby creating a vacuum in inner cavity 1821 (sec FIGS. 18 and 19). The spring 1807 (which may be rubber) is coupled to the rubber base on one side and to all of the sides 1806*a-c* and the hinges 1804*a-c* to seal the holes 1822 from the outside (i.e., to seal it from the backside of the cup member 1802).

Figure 21:
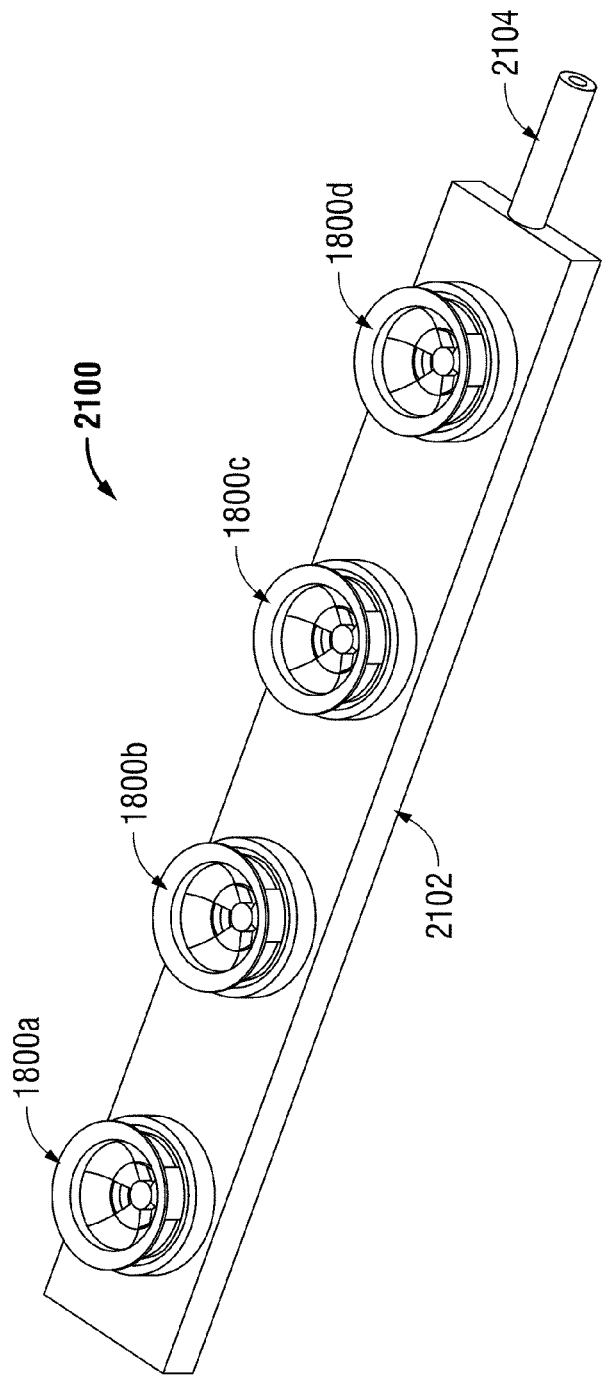
FIG. 21 shows a plurality of suction grippers of FIG. 18 disposed on a substrate in accordance with an embodiment of the present disclosure.

FIG. 21 shows a plurality of suction grippers 2100 (i.e. suction grippers 1800*a-d*) disposed on a substrate 2102 in accordance with an embodiment of the present disclosure. A suction tube 2104 provides a suction source for each of suction grippers 1800 via a suction port (not shown).

Figure 22:
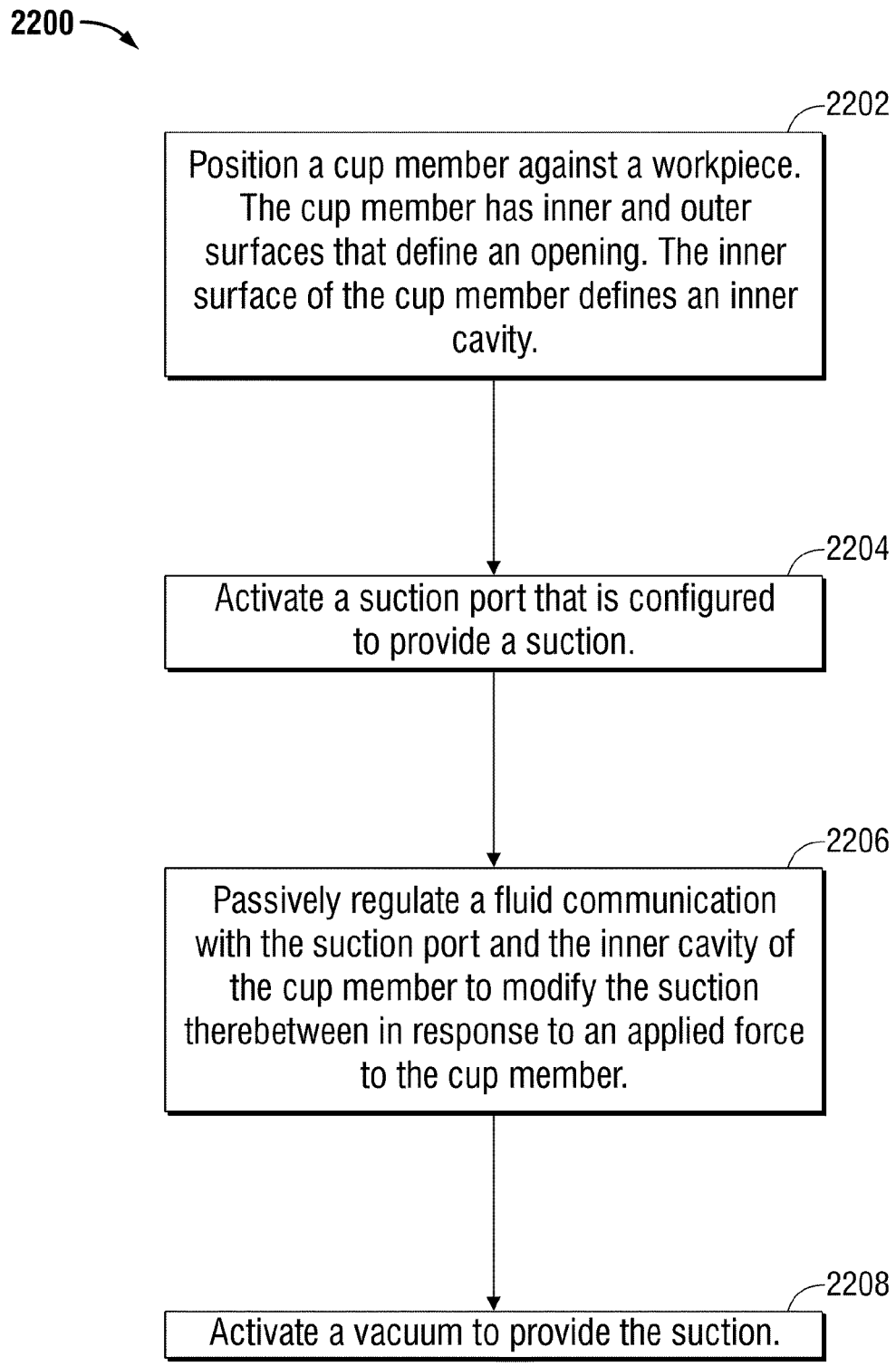
FIG. 22 shows a method of using a suction gripper in accordance with an embodiment of the present disclosure.

FIG. 22 shows a method 2200 of using a suction gripper in accordance with an embodiment of the present disclosure. Method 2200 includes acts 2202, 2204, 2206, and 2208. Act 2202 positions a cup member against a workpiece. The member has inner and outer surfaces that defines an opening. The inner surface of the cup member defines an inner cavity. The cup member of act 2202 may be cup member 104 of FIGS. 1A and 1B, or the cup member 1802 of FIG. 18-20. Act 2202 activates a suction port that is configured to provide a suction force. The suction port of act 2204 may be the suction port 132 of FIGS. 1A-1B, or the suction port 1818 of FIG. 18. Act 2206 passively regulates a fluid communication (e.g., air communication in some embodiments) between (or with) the suction port and the inner cavity of the cup member to modify the suction therebetween in response to an applied force to the cup member. Act 2208 activates a vacuum to provide the suction of Acts 2204 and 2206.

Although the present disclosure has been described in considerable detail with reference to certain preferred version thereof, other versions are possible and contemplated. For example, other materials besides plastics and rubbers may be used, e.g., various polyurethanes, polymers, and the like. Therefore, the spirit and scope of the appended claims should not be limited to the description of the preferred versions contained therein.

Any element in a claim that does not explicitly state "means for" performing a specified function or "step for" performing a specified function, is not to be interpreted as a "means" or "step" clause as specified in 35 U.S.C. §112, ¶6. In particular, the use of "step of" in the claims is not intended to invoke the provisions of 35 U.S.C. §112, ¶6.

What is claimed is:

1. A suction gripping system, comprising:
 a flexible sheet including a suction tube along a length thereof; and
 a plurality of suction grippers comprising a cup member having inner and outer surfaces defining an opening, the inner surface defining an inner cavity;
 a suction port configured to provide a suction; and
 a valve in fluid communication with the suction port and the inner cavity of the cup member to modify the suction therebetween, wherein the valve is operatively coupled to the cup member and is adapted to passively actuate in response to an applied force to the cup member, wherein each suction gripper is disposed along the length of the flexible sheet, wherein each suction port is operatively coupled to the suction tube and configured to provide a suction.

2. A method, comprising:
 positioning a cup member against a workpiece, wherein the cup member having inner and outer surfaces defining an opening, the inner surface defining an inner cavity;

activating a suction port configured to provide a suction;
passively regulating a fluid communication with the suction port and the inner cavity of the cup member to modify the suction therebetween in response to an applied force to the cup member;
plugging an orifice of the suction port when no force is applied to the cup member by a plug disposed substantially at a center of the cup member and opposite to the opening; and
unplugging an orifice of the suction port when a threshold force is applied to the cup member by the plug, the orifice located substantially at the center of the cup member.

3. The method according to claim 2, further comprising activating a vacuum to provide the suction.

4. A suction gripper, comprising:
a substrate;
a cup member having inner and outer surfaces defining an opening, the inner surface defining an inner cavity, wherein the cup member is mechanically coupled to the substrate and is moveable from a first position to a second position;
a suction port configured to provide a suction;
a valve in fluid communication with the suction port and the inner cavity of the cup member to modify the suction therebetween, the valve configured to open and close; and
a mechanical linkage assembly adapted to open the valve when the cup member is in the first position and close the valve when the cup member is in the second position, wherein the valve comprises a plug disposed substantially at the center of the cup member and opposite to the opening to plug an orifice of the suction port when no force is applied to the cup member, the orifice located substantially at the center of the cup member.

5. The suction gripper according to claim 4, wherein the mechanical linkage assembly includes a hinge adapted to lift the plug of the valve when the cup member is in the second position.

6. A suction gripper comprising:
a substrate.
a cup member having inner and outer surfaces defining an opening, the inner surface defining an inner cavity, wherein the cup member is mechanically coupled to the substrate and is moveable from a first position to a second position;
a suction port configured to provide a suction;
a valve in fluid communication with the suction port and the inner cavity of the cup member to modify the suction therebetween, the valve configured to open and close; and
a mechanical linkage assembly adapted to open the valve when the cup member is in the first position and close the valve when the cup member is in the second position, wherein the valve comprises a plug disposed substantially at the center of the cup member and opposite to the opening to plug an orifice of the suction port when no force is applied to the cup member,
wherein the valve comprises a plug, the plug comprising:
an elongated shaft defining a central axis, and having first and second ends;
a flange coupled to the first end of the elongated shaft and extending in a radial direction perpendicular to the central axis of the elongated shaft;
at least one spring coupled to the flange and a base of the cup member thereby providing elasticity therebetween; and
a tip coupled to the second end of the elongated shaft and shaped to plug an orifice of the suction port.

7. A suction gripper, comprising:
a cup member having inner and outer surfaces defining an opening, the inner surface defining an inner cavity;
a suction port configured to provide a suction; and
a valve in fluid communication with the suction port and the inner cavity of the cup member to modify the suction therebetween, wherein the valve is operatively coupled to the cup member and is adapted to passively actuate in response to an applied force to the cup member, wherein the valve comprises a plug disposed substantially at a center of the cup member and opposite to the opening to plug an orifice of the suction port when no force is applied to the cup member and unplug the orifice when a threshold force is applied to the cup member, the orifice located substantially at the center of the cup member.

8. The suction gripper according to claim 7, wherein the plug comprises a tip in proximity to a sealing surface, wherein the tip is made of a soft material, and wherein the plug and the sealing surface are conical.

9. The suction gripper according to claim 7, the plug further comprising:
an elongated shaft defining an axis, and having first and second ends;
a flange coupled to the first end of the elongated shaft and extending in a radial direction perpendicular to the axis of the elongated shaft;
at least one spring coupled to the flange and a base of the cup member; and
a tip coupled to the second end of the elongated shaft and shaped to plug an orifice of the suction port.

10. The suction gripper according to claim 7, further comprising:
a base of the cup member formed opposite to the opening of the cup member, the base having a first surface partially forming the inner cavity of the cup member, and a second surface opposite to the first surface;
a collar defining a central axis, and having proximal and distal sides, the collar having a tube disposed about parallel to the central axis, wherein the proximal side of the collar is disposed adjacent to the second surface of the base of the cup member and the distal side of the collar is disposed a predetermined distance from the second surface of the base of the cup member;
an orifice of the suction port defined by a fluid connection between the base of the cup member and the tube in the collar;
a plug comprising:
an elongated shaft defining a central axis, and having first and second ends;
a flange coupled to the first end of the elongated shaft and extending in a radial direction perpendicular to the central axis of the elongated shaft;
at least one spring coupled to the flange and the base of the cup member thereby providing elasticity therebetween; and
a tip coupled to the second end of the elongated shaft and shaped to plug the orifice of the suction port;
a lip along the opening of the cup member.

11. The suction gripper according to claim 7, wherein the valve further comprises a spring whereby the valve is normally closed.

12. The suction gripper according to claim 7, wherein the cup includes a rigid cylinder.

13. The suction gripper according to claim 7, wherein cup includes a lip defining the opening of the cup member.

14. The suction gripper according to claim 13, wherein the lip flares outward from the cup member.

15. The suction gripper according to claim 7, further comprising a rigid tube coupled to the suction port to provide the suction.

16. The suction gripper according to claim 7, further comprising:
a base of the cup member formed opposite to the opening of the cup member, the base having a first surface partially forming the inner cavity of the cup member, and a second surface opposite to the first surface; and
a collar defining a central axis, and having proximal and distal sides, wherein the proximal side of the collar is disposed adjacent to the second surface of the base of the cup member and the distal side of the collar is disposed a predetermined distance from the second surface of the base of the cup member, wherein an outer surface of the collar slopes inwardly from the distal side to the proximal side.

17. The suction gripper according to claim 16, further comprising a hinge shaped to engage the collar thereby providing a lever action as the base is stretched over the proximal side of the collar.

18. The suction gripper according to claim 7, the cup member further comprising:
a hinge radial partition coupled to the plug and extending therefrom, wherein the hinge radial partition is formed of a rigid material; and
a side radial partition extending from the plug and forming a hole adjacent to the plug, wherein the side radial partition is formed of a soft material.

19. The suction gripper according to claim 18, further comprising a collar having proximal and distal sides, wherein the proximal side of the collar is shaped to cooperate with the hinge partition to lift the plug out of the orifice of the suction port.

20. The suction gripper according to claim 19, wherein the distal side of the collar is attached to a base formed of a soft material.

21. The suction gripper according to claim 18, further comprising:
a collar having proximal and distal sides; and
a ring-shaped spring having top and bottom surfaces, wherein the top surface is attached to the hinge radial partition and to the side radial partition thereby preventing air leakage from the orifice and around the outer surface of the cup member.

22. The suction gripper according to claim 7, the cup member further comprising:
first, second, and third hinge radial partitions each coupled to the plug and extending therefrom, wherein each of the hinge radial partitions is formed of a rigid material; and
first, second, and third side radial partitions each extending from the plug and forming a hole adjacent to the plug, each of the radial partitions is made of a soft material;
wherein the first hinge radial partition is adjacent to the first side radial partition, the second hinge radial partition is adjacent to the first hinge radial partition, the second side radial partition is adjacent to the second hinge radial partition, the third hinge radial partition is adjacent to the second side radial partition, the third side radial partition is adjacent to the first hinge radial partition and the third hinge radial partition; and a collar having proximal and distal sides, wherein the proximal side of the collar is shaped to cooperate with the first, second, and third hinge radial partitions to lift the plug out of the orifice of the suction port; and
a ring-shaped spring having top and bottom surfaces, wherein the top surface is attached to the first, second, and third hinge radial partitions and to the first, second and third side radial partition thereby preventing air leakage from the orifice and around the outer surface of the cup member.

23. The suction gripper according to claim 7, further comprising a mechanical linkage assembly comprising a lifting member, wherein the mechanical linkage assembly is coupled to the cup, and the lifting member is adapted to lift the plug out of the orifice when a force is applied to the cup member.

24. A suction gripper, comprising:
a cup member having inner and outer surfaces defining an opening, the inner surface defining an inner cavity;
a suction port configured to provide a suction;
a valve in fluid communication with the suction port and the inner cavity of the cup member to modify the suction therebetween, wherein the valve is operatively coupled to the cup member and is adapted to passively actuate in response to force applied to the cup member; and
a plug, the plug comprising:
an elongated shaft defining an axis, and having first and second ends;
a flange coupled to the first end of the elongated shaft and extending in a radial direction perpendicular to the axis of the elongated shaft;
at least one spring coupled to the flange and a base of the cup member; and
a tip made from a soft material and coupled to the second end of the elongated shaft and shaped to
plug an orifice of the suction port.

25. The suction gripper according to claim 24, wherein the elongated shaft and the flange are made of a rigid material.

26. The suction gripper according to claim 24, further comprising a mechanical linkage assembly comprising a lifting member, wherein the mechanical linkage assembly is coupled to the cup, and the lifting member is adapted to lift the tip out of the orifice when a force is applied to the cup member.

27. The suction gripper according to claim 24, further comprising a lifting member leveraged against the cup member to lift the tip out of the orifice when the cup member moves relative to a collar.

28. A suction gripper, comprising:
a cup member having inner and outer surfaces defining an opening, the inner surface defining an inner cavity;
a suction port configured to provide a suction;
a valve in fluid communication with the suction port and the inner cavity of the cup member to modify the suction therebetween, wherein the valve is operatively coupled to the cup member and is adapted to passively actuate in response to a force applied to the cup member;
a base of the cup member formed opposite to the opening of the cup member, the base having a first surface partially forming the inner cavity of the cup member, and a second surface opposite to the first surface;
a collar defining a central axis, and having proximal and distal sides, the collar having a tube disposed about parallel to the central axis, wherein the proximal side of the collar is disposed adjacent to the second surface of the base of the cup member and the distal side of the collar is disposed a predetermined distance from the second surface of the base of the cup member;
an orifice of the suction port defined by a fluid connection between the base of the cup member and the tube in the collar;
a plug comprising:
   a elongated shaft defining a central axis, and having first and second ends;
   a flange coupled to the first end of the elongated shaft and extending in a radial direction perpendicular to the central axis of the elongated shaft;
   at least one spring coupled to the flange and the base of the cup member thereby providing elasticity therebetween; and
   a tip coupled to the second end of the elongated shaft and shaped to plug the orifice of the suction port;
a lip along the opening of the cup member.

29. The suction gripper according to claim 21, wherein the cup member includes a rigid cylinder having an open top and bottom, wherein the lip is attached to the top of the rigid cylinder forming the opening of the cup member, and the base is attached to the bottom of the rigid cylinder.

30. The suction gripper according to claim 29, further comprising at least one hinge coupled to the base and shaped to lift the flange of the plug when the base is stretched over the proximal side of the collar.

31. The suction gripper according to claim 30, wherein the at least one hinge includes at least one bend along a length thereof.

* * * * *

UNITED STATES PATENT AND TRADEMARK OFFICE
CERTIFICATE OF CORRECTION

PATENT NO. : 8,382,174 B2  
APPLICATION NO. : 12/901241  
DATED : February 26, 2013  
INVENTOR(S) : Jaydev P. Desai et al.

Page 1 of 2

It is certified that error appears in the above-identified patent and that said Letters Patent is hereby corrected as shown below:

In the Drawings:

Sheet 1, Fig. 1A, please enlarge the dashed circle referenced by 122 to include within it spring 137, flange 126, plug 136, hinge 128 and base 116;

Sheet 10, Fig. 10, please move flexible array 900 to the left, under the compression plate;

Sheet 16, Fig. 18, please remove reference numeral "1804a" referencing the hashed portion.

In the Specification:

Column 1, line 39-40, delete "surroundings air/or" and replace it with --surrounding air--;
Column 1, line 51, delete "uses" and replace it with --use--;
Column 2, line 20, insert a --.-- after "sheet";
Column 5, line 7, insert --to-- between "102" and "open.";
Column 5, line 26, delete "A suction" and replace with --Suction--;
Column 5, line 48, after "workpiece", insert --(i.e., unengaged cup member),--;
Column 5, line 49, after "remains sealed", delete "," and insert --. This minimizes--; and delete "minimizing";
Column 5, line 50, after 104, insert --and--, and after "thereby", replace "maximizing" with --maximizes--;
Column 5, line 51, after "suction force", insert --of the--;
Column 5, line 51, replace "grippers' conection" with --grippers which are connected--;
Column 6, line 49, delete reference numeral "126" and replace it with --140--;
Column 7, line 13, delete "displaced a" and replace it with --set. A--;
Column 7, line 30, delete reference numeral "138" and replace it with --128--;
Column 7, line 50, "f" between "where" and "is" should be italicized.
Column 9, line 4, delete "static" and replace it with --quasi-static--;
Column 9, line 16, insert a --.-- after the word "embodiment";

Signed and Sealed this  
Twenty-first Day of May, 2013

Teresa Stanek Rea  
*Acting Director of the United States Patent and Trademark Office*

CERTIFICATE OF CORRECTION (continued)
U.S. Pat. No. 8,382,174 B2

Column 9, line 21, delete the word "with.";
Column 9, line 22, delete the word "were" and replace it with --was--;
Column 9, line 39, after "manufactured", insert --out of ABS plastic--;
Column 10, line 23, after "rubber strip", insert --2102--;
Column 10, line 24, delete "Fig. 8" and replace it with --Fig. 9.--;
Column 10, line 51, replace "Fig. 12" with --Fig. 10--;
Column 11, line 5, after "flexible array", insert --900--;
Column 11, line 35, delete "gripper 902" and replace it with --grippers 902a-d--;
Column 11, line 63, insert a "," after the word "force";
Column 12, lines 8-9, after "open cups", delete "(i.e., seal-sealing suction grippers,";
Column 12, lines 9-10, after "sealed blank slides", delete "(i.e., seal-sealing suction grippers. For example, suction gripper 900 may be measured in various configurations.";
Column 12, line 15, after "an infinite", insert --number of suction grippers-- and delete "configuration";
Column 12, line 19, after "Referring to Fig.", replace "17" with --14--;
Column 12, line 22, after "substrate 904", delete "were added";
Column 12, line 30, after "suction grippers", replace "900" with --902a-d--;
Column 12, lines 34-35, after "All of", delete "suction gripper of" and add --the--;
Column 12, line 35, after "suction grippers", replace "900" with --902a-d--;
Column 12, line 37, after "suction grippers", replace "900" with --902a-d--;
Column 12, line 43, after "suction grippers", replace "900" with --902a-d--;
Column 12, line 59, after "suction grippers", replace "900" with --902a-d--;
Column 13, line 1, after "picked up with", insert --a flexible array-- and delete "suction gripper of suction grippers";
Column 13, line 3, after "gripping a", replace "coffee mug" with --bowl--;
Column 13, line 5, after "gripping a", replace "volleyball" with --soccer ball--;
Column 13, line 9, after "902a-d is", delete "actuated";
Column 13, line 12, after the word "finite", insert --element--;
Column 13, line 23, after reference numeral "112", delete the word "of";
Column 13, line 24, after the word "release", insert --)--;
Column 13, line 40, replace "perspective" with --side--;
Column 14, line 2, replace "1804" with --1804a-c--;
Column 14, line 34, replace "version" with --versions--.